US012260710B2

(12) United States Patent
Marks et al.

(10) Patent No.: US 12,260,710 B2
(45) **Date of Patent: *Mar. 25, 2025**

(54) SYSTEM AND METHOD FOR MULTILEVEL AUTONOMOUS TOURNAMENTS

(71) Applicant: Aristocrat Technologies, Inc., Las Vegas, NV (US)

(72) Inventors: Daniel Marks, Decatur, GA (US); Hua Xu, Marietta, GA (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/495,710

(22) Filed: Oct. 26, 2023

(65) Prior Publication Data

US 2024/0054865 A1 Feb. 15, 2024

Related U.S. Application Data

(63) Continuation of application No. 17/454,781, filed on Nov. 12, 2021, now Pat. No. 11,830,326, which is a continuation of application No. 16/838,022, filed on Apr. 1, 2020, now Pat. No. 11,176,780.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.
CPC ...... *G07F 17/3276* (2013.01); *G07F 17/3213* (2013.01); *G07F 17/3244* (2013.01)

(58) Field of Classification Search
CPC .. G07F 17/32; G07F 17/3211; G07F 17/3214; G07F 17/3222
USPC .............................. 463/1, 20, 22, 25, 30, 39
See application file for complete search history.

(56) References Cited

U.S. PATENT DOCUMENTS

| | | | |
|---|---|---|---|
| 7,824,267 | B2 | 11/2010 | Cannon |
| 2009/0197670 | A1 | 8/2009 | Kelly |
| 2013/0005447 | A1 | 1/2013 | Lutnick |
| 2014/0141866 | A1 | 5/2014 | Irwin, Jr. |

OTHER PUBLICATIONS

Notice of Allowance dated Jul. 13, 2021 for U.S. Appl. No. 16/838,022 (pp. 1-6).

(Continued)

*Primary Examiner* — Adetokunbo O Torimiro
(74) *Attorney, Agent, or Firm* — Weaver Austin Villeneuve & Sampson LLP

(57) ABSTRACT

Systems and techniques for providing multilevel autonomous tournaments for wagering game are provided. In some implementations, players may earn entry into such a tournament by meeting one or more criteria and then be associated with a tournament entry for that tournament. Each tournament entry may be associated with a set of tournament entries and, after a requisite number of tournament entries for a given tournament entry set has been associated with players, a selection of a tournament entry, and thus at least implicitly a player, may be made. The players selected in such a selection event may then be associated with a tournament entry in a next-highest tournament tier. Such selections may occur until a single player is selected from the highest-ranked tournament tier of the tournament.

20 Claims, 8 Drawing Sheets

(56) References Cited

OTHER PUBLICATIONS

Office Action (Non-Final Rejection) dated Jan. 20, 2023 for U.S. Appl. No. 17/454,781 (pp. 1-5).
Office Action (Notice of Allowance and Fees Due (PTOL-85)) dated Jul. 19, 2023 for U.S. Appl. No. 17/454,781 (pp. 1-5).

SYSTEM AND METHOD FOR MULTILEVEL AUTONOMOUS TOURNAMENTS

RELATED APPLICATION(S)

The present application is a continuation of U.S. patent application Ser. No. 17/454,781, filed on Nov. 12, 2021, and titled "SYSTEM AND METHOD FOR MULTILEVEL AUTONOMOUS TOURNAMENTS," which is itself a continuation of U.S. patent application Ser. No. 16/838,022, filed on Apr. 1, 2020, and titled "SYSTEM AND METHOD FOR MULTILEVEL AUTONOMOUS TOURNAMENTS" and which issued as U.S. Pat. No. 11,176,780 on Nov. 16, 2021, which is hereby incorporated by reference herein in its entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

Disclosed herein are various techniques and systems for providing multilevel autonomous tournaments (MATS); such tournaments may generally operate autonomously once a player is entered into the tournament, although in some implementations, further player participation may be required if the player, for example, reaches a high-enough tournament tier.

Generally speaking, a computing system may provide an MAT by defining or generating a plurality of tournament entry sets, each tournament entry set having a plurality of tournament entries. A tournament entry, as the term is used herein, refers to a data record or placeholder that is associated with a particular tournament entry set. Each tournament entry may, for example, be used to store information that is associated with a particular player that gains entry into the tournament; such information may, for example, be a player tracking number or other unique identifier that identifies the player. The tournament entry sets for a given MAT may, in turn, each be associated with a tournament tier of the MAT. An MAT may, generally speaking, always have a plurality of tournament tiers, e.g., N tournament tiers, and each tournament tier may be associated with one or more tournament entry sets. In a typical MAT, the each higher-ranked tournament tier may generally have fewer tournament entry sets associated therewith than lower-ranked tournament tiers. For example, in an MAT that has N=5 tournament tiers, the first tournament tier may have more tournament entry sets than the second tournament tier, the second tournament tier may have more tournament entry sets than the third tournament tier, the third tournament tier may have more tournament entry sets than the fourth tournament tier, and the fourth tournament tier may have more tournament entry sets than the fifth tournament tier. Generally speaking, the highest ranked tournament tier in an MAT may be associated with a single tournament entry set.

Once an MAT has been initiated, each player that gains entry to the MAT, e.g., by way of achieving a particular outcome on an EGM, may be associated with a corresponding one of the tournament entries associated with the tournament entry sets of the first tournament tier of the MAT. Players may be associated with such a tournament entry through any suitable mechanism. In some implementations, players may be associated with tournament entries based on outcomes in a base wagering game. For example, a player playing a base wagering game, such as a slot machine game, may achieve a game outcome in the base wagering game that results in the player being awarded an entry into the MAT. The computing system administering the MAT may, upon receiving an indication that the player has gained entry into the MAT, associate the player with one of the tournament entries associated with the tournament entry sets associated with the first tournament tier. To be clear, reference to an EGM in the context of the MAT discussions herein is to be understood as being inclusive of both "traditional" EGMs located on casino floors as well as "non-traditional" EGMs, such as cell phones, tablets, or other computing devices that may be communicatively connected with an MAT system. Such EGMs may be either revenue-generating EGMs (which are typically, at least in today's environment, subject to strict regulatory oversight and which accept real currency and may award monetary awards) or social EGMs (which may be played for non-fungible credits, social gaming points, or other non-fungible prizes).

After a predetermined threshold number of tournament entries for a given tournament entry set have been associated with players, the computing system may select one or more of the tournament entries for that tournament entry set; the players associated with those selected tournament entries may then be associated with tournament entries in a tournament entry set associated with the tournament tier that is ranked one level higher than the tournament tier associated with the given tournament entry set. The predetermined threshold number of tournament entries, in many cases, will be equal to the number of tournament entries in the given tournament entry set, i.e., requiring that players be associated with all of the tournament entries for that tournament entry set. In other cases, however, less than all of the tournament entries for that tournament entry set need to be associated with players in order for the predetermined threshold number of tournament entries to be met. In such implementations, the computing system may be configured to either avoid selection of tournament entries that are not associated with players, remove tournament entries not associated with players from the tournament entry set prior to selecting the one or more tournament entries therefrom, or not associate any player from the given tournament entry set with another tournament entry set associated with the next-highest ranked tournament tier responsive to selection of a tournament entry that is not associated with a player.

The selection of one or more tournament entries from a given tournament entry set may be based, at least in part, on a random outcome. For example, the computing system may randomly select one of the tournament entries from the given tournament entry set. In another implementation, the computing system may utilize other criteria for selecting a tournament entry from the given tournament entry set, as will be discussed later herein.

It will be understood that the computing system may select tournament entries from the tournament entry sets for a given tournament tier after the threshold number of tournament entries for each such tournament entry set have been associated with players in a number of different ways. In some implementations, the computing system may wait until the threshold number of tournament entries for all of the tournament entry sets for the given tournament tier have been associated with players before selecting any tournament entries from those tournament entry sets, e.g., once all of tournament entries for the tournament entry sets for that given tournament tier are fully "populated" with players. In some such systems, the selections of the one or more tournament entries from the tournament entry sets for the given tournament tier may occur generally simultaneously.

In some other implementations, the computing system may select the one or more tournament entries from at least some of the tournament entry sets for the given tournament tier before the threshold number of tournament entries for all of the tournament entry sets for the given tournament tier have been associated with players. In yet other implementations, the computing system may select the one or more tournament entries from at least some of the tournament entry sets for the given tournament tier based, at least in part, on a schedule. For example, the computing system may select one or more tournament entries from a different one of the tournament entry sets associated with the given tournament tier every five minutes (or other time period), assuming there is at least one tournament entry set that has the threshold number of tournament entries associated with players when that time interval occurs (if not, then a selection may be skipped for that time interval and a further time interval may be allowed to pass before another selection event is considered).

It will be apparent that as players are selected from the tournament entries associated with tournament entry sets of a lower tournament tier and then associated with tournament entries of a tournament entry set or tournament entry sets associated with the next-highest tournament tier, the number of players that progress from each tier to the next-highest tier will shrink from tier to tier. Eventually, there will be a very limited pool of players associated with the tournament entry set of the highest tournament tier of the MAT, and a final selection of a player to be the MAT winner may be made from that tournament entry set once the threshold number of tournament entries for that tournament entry set have been associated with players.

As noted earlier, an MAT may be conducted in a largely automatic manner, with the players that gain entry to the MAT generally playing no active role in the MAT beyond gaining entry thereto. The player may, of course, observe the MAT, check on their progress or on results of the MAT (or of various intermediate stages of the MAT), and so forth, but these activities are not required in order for the MAT to progress. In some implementations, however, an MAT may be configured to require certain players to actively perform actions under certain conditions in order for the player's entry into the MAT to be maintained (or for the player to not be otherwise penalized). For example, an example MAT may feature a first tournament tier having 10,000 tournament entry sets associated therewith, a second tournament tier having 1000 tournament entry sets associated therewith, a third tournament tier having 100 tournament entry sets associated therewith, a fourth tournament tier having 10 tournament entry sets associated therewith, and a fifth and highest tournament tier having a single tournament entry set associated therewith; each tournament entry set of such an example MAT may have ten tournament entries associated therewith and the MAT may be configured to select a single tournament entry from each set of tournament entries once all of the tournament entries for that tournament entry set have been associated with players and then associate the player associated with that selected tournament entry with a tournament entry in a tournament entry set of the next highest tier (or, in the case of the player associated with the tournament entry selected from the tournament entry set of the fifth tournament tier, designate that player as the tournament winner). In such an implementation, players that are associated with tournament entries associated with the tournament entry set or tournament entry sets of the fifth tournament tier, the fifth and fourth tournament tiers, or the fifth, fourth, and third tournament tiers may be required to, for example, travel to a particular physical location, e.g., a casino, in order to continue to maintain their entry into the tournament. For example, the entity operating the MAT may wish to turn the selection of the winner from the tournament entry set of the fifth tournament tier into a publicity event, with all of the players associated with the tournament entries for that tournament entry set present on a stage and with a graphical construct representing that tournament entry set and the tournament entries thereof, displayed on a screen that all of the gathered players can observe simultaneously. Video and audio of such a presentation may, for example, be recorded and transmitted (or stored for later transmission or distribution) to one or more locations for viewing by spectators. Once those players have all arrived at the designated location, then selection of the winner may commence. In some instances, the selection of the winner may occur at a designated time regardless of whether the players associated with tournament entries in the tournament entry set from which the selection will be made are all present; in such cases, players that are not present (and thus do not, for example, meet a condition required to maintain their entry in the MAT) may be removed from the MAT. For example, the tournament entries associated with players that are not present may be disassociated from the relevant tournament entry set prior to selection and thus not be selectable from the tournament entry set during the selection event (other mechanisms for effectively preventing such players from progressing further in that MAT or from winning the MAT may alternatively be used).

It will be appreciated that the computing system that manages a given MAT may be configured to cause graphical output to be generated on one or more display devices that provide insight as to the status of the tournament entry sets, players associated with the tournament entries associated with those tournament entry sets, selections made from the tournament entry sets, and so forth. For example, each tournament entry set may be represented by a graphical construct that may include one or more regions that depict tournament entries associated with that tournament entry set. For example, the computing system may cause a tournament entry set to be represented by a graphical construct of a wheel that is subdivided into equally sized sectors or segments that correspond in number to the number of tournament entries associated with that tournament entry set. Each sector of the wheel may represent one of the tournament entries associated with that tournament entry set. In some implementations, the computing system may cause information identifying or representing the player associated with a particular tournament entry to be displayed in connection with the sector representing that tournament entry. For example, the sector may have text within it indicating the player's name, a user name of the player, an image or animation of an avatar of the player, a number or other code representing the player, an image of the player, live video of the player, or combinations of any of these types of content. During selection of a tournament entry from the tournament entry set of such a wheel display, the computing system may, for example, cause an animation to occur that gives the impression that the wheel is spinning relative to a fixed pointer, that a pointer is rotating about the circumference of the wheel, or that both the wheel and a pointer are rotating relative to each other about a common rotational center; the computing system may cause relative motion between the wheel and pointer to eventually stop such that the pointer is aligned with or otherwise indicates the sector representing the selected tournament entry.

Another type of graphical construct that may be used to represent a tournament entry set is a reel display, which may represent the tournament entry set as a cylinder viewed along an axis perpendicular to its center axis such that only a portion of the cylindrical surface thereof is visible at any given moment. As with the wheel display, the reel display may be subdivided into sectors, with each sector representing a tournament entry of the tournament entry set. Whereas the portion of the sector visible in the wheel display may be generally triangular or wedge-shaped, the portion of the sector visible in the reel display may be generally rectangular or a curved rectangular surface. Information may be optionally caused to be displayed that identifies or represents the player associated with the tournament entry represented by each reel display sector. Any suitable type of graphical construct may be used to represent the tournament entry sets and tournament entries as well, although it will be generally understood that many or most such graphical constructs may generally give the players a sense of how many, or at least the magnitude of, tournament entries that are associated with the tournament entry sets, as well as a sense of how many tournament entries for a tournament entry set represented by such a graphical construct have been associated with players.

In some implementations, a tournament server may be provided that includes a tournament server having one or more processors and one or more memory devices. The one or more processors and the one or more memory devices may be operably connected, and the one or more memory devices may store computer-executable instructions which, when executed by the one or more processors, cause the one or more processors to at least: a) generate a plurality of tournament entry sets, wherein each tournament entry set is associated with a corresponding tournament tier of N tournament tiers for a multilevel autonomous tournament, N is an integer greater than 1, each tournament entry set is associated with a corresponding threshold number of tournament entries for that tournament entry set, and the Nth tournament tier has a single tournament entry set associated therewith; b) receive a plurality of player entry indications for the multilevel autonomous tournament, each player entry indication including information that associates the player entry indication with a particular player identifier; c) associate, for each received player entry indication, the player identifier associated with that player entry identification with one of the tournament entries of one of the tournament entry sets for the first tournament tier; d) select, for each tournament entry set associated with a tournament tier of the multilevel autonomous tournament other than the Nth tournament tier, after the corresponding threshold number of tournament entries for that tournament entry set have each been associated with a corresponding player identifier, and based at least in part on a random outcome, one or more of the tournament entries for that tournament entry set; e) associate, for each tournament entry selected in (d), the player identifier associated with that selected tournament entry with a corresponding one of the tournament entries for the tournament entry set or one of the tournament entry sets of the tournament tier one tier higher than the tournament tier of that selected tournament entry; and f) select, after the corresponding threshold number of tournament entries for the tournament entry set associated with the Nth tournament tier have each been associated with a corresponding player identifier, one of the tournament entries of that tournament entry set as a winner of the multilevel autonomous tournament.

In some implementations of the tournament server, the one or more memory devices may further store additional computer-executable instructions which, when executed by the one or more processors, further cause the one or more processors to at least cause, for each tournament entry set, a graphical representation of that tournament entry set to be displayed on one or more displays, wherein the graphical representation of each tournament entry set is a wheel divided in to a plurality of segments and each segment of that wheel represents one of the tournament entries for that tournament entry set.

In some implementation of the tournament server having graphical representations of tournament entry sets that are wheels, each wheel may have between 6 and 20 segments.

In some implementation of the tournament server having graphical representations of tournament entry sets that are wheels, the wheels may all have the same number of segments.

In some implementations of the tournament server, the one or more memory devices may further store additional computer-executable instructions which, when executed by the one or more processors, further cause the one or more processors to at least perform (d) for the tournament entry sets for each tournament tier after player identifiers have been associated with the threshold number of tournament entries for all of the tournament entry sets associated with that tournament tier.

In some implementations of the tournament server, the one or more memory devices may further store additional computer-executable instructions which, when executed by the one or more processors, further cause the one or more processors to at least perform (d) for each tournament entry set as the threshold number of tournament entries for that tournament entry set are associated with player identifiers.

In some implementations of the tournament server, the one or more memory devices may further store additional computer-executable instructions which, when executed by the one or more processors, further cause the one or more processors to at least generate the tournament entry sets such that the second through Nth tournament tiers are each associated with a lower number of tournament entry sets than the next lowest tournament tier.

In some implementations of the tournament server, the one or more memory devices may further store additional computer-executable instructions which, when executed by the one or more processors, further cause the one or more processors to at least perform (d) for each of the tournament entry sets associated with the tournament tier or tournament tiers of the multilevel autonomous tournament other than the Nth tournament tier automatically once the player identifiers associated with the tournament entries for that tournament entry set have been associated with the tournament entries for that tournament entry set.

In some implementations of the tournament server, each player entry indication may be indicative of a player associated with the player identifier associated therewith achieving an outcome in a base wagering game that awards an entry into the multilevel autonomous tournament.

In some implementations of the tournament server, the tournament entry sets for the first tournament tier may include a first set of tournament entry sets; each tournament entry set in the first set of tournament entry sets may be associated with a different corresponding set of electronic gaming machines; and the one or more memory devices may further store additional computer-executable instructions which, when executed by the one or more processors, further cause the one or more processors to at least, for each tournament entry set in the first set of tournament entry sets, only associate player identifiers with the tournament entries for that tournament entry set responsive to player entry indications originating from electronic gaming machines in the set of electronic gaming machines corresponding with that tournament entry set.

In some such implementations of the tournament server, each set of electronic gaming machines may be a set of electronic gaming machines that are in a common bank of electronic gaming machines, a set of electronic gaming machines that are in a particular area of a casino, a set of electronic gaming machines that are in a particular casino, or a set of electronic gaming machines that are distributed across a plurality of casinos.

In some implementations of the tournament server, the one or more memory devices may further store additional computer-executable instructions which, when executed by the one or more processors, further cause the one or more processors to at least: i) determine, for each tournament entry associated with the tournament entry sets associated with the first tournament tier, a score associated therewith; ii) perform, for each tournament entry set and after the corresponding threshold number of tournament entries for that tournament entry set have each been associated with a corresponding player identifier, one or more rounds of score modification for that tournament entry set; and iii) cause the score, as modified in (2), associated with each tournament entry selected in (d) to also be associated with the tournament entry that is associated in (e) with the player identifier for the tournament entry selected in (d). In such implementations, each round of score modification for a tournament entry set may include: 1) randomly selecting one or more of the tournament entries for that tournament entry set, and 2) modifying each score associated with the one or more tournament entries selected in (1) by performing an action such as multiplying the score by a multiplier value or adding an additional amount to the score.

In some further such implementations of the tournament server, the one or more memory devices may further store additional computer-executable instructions which, when executed by the one or more processors, further cause the one or more processors to at least cause a player associated with the player identifier associated with the tournament entry that is selected as the winner of the multilevel autonomous tournament in (f) to be awarded a monetary amount proportional to the score associated with that tournament entry.

In some other or additional such implementations of the tournament server, the one or more memory devices may further store additional computer-executable instructions which, when executed by the one or more processors, further cause the one or more processors to at least select the one or more tournament entries in (d) based on the scores, as modified in (2), of the tournament entries within each tournament entry set associated with the tournament tier or tournament tiers of the multilevel autonomous tournament other than the Nth tournament tier.

In some other or additional such implementations of the tournament server, the one or more memory devices may further store additional computer-executable instructions which, when executed by the one or more processors, further cause the one or more processors to at least use the one or more tournament entries selected in the final round of score modification for each tournament entry set associated with the tournament tier or tournament tiers of the multilevel autonomous tournament other than the Nth tournament tier as the one or more tournament entries selected in (d) for that tournament entry set.

In some implementations of the tournament server, the one or more memory devices may further store additional computer-executable instructions which, when executed by the one or more processors, further cause the one or more processors to at least, for each tournament entry selected in (d) and (f), randomly select that tournament entry.

In some implementations, a method may be provided that includes: a) generating a plurality of tournament entry sets using a tournament server, wherein each tournament entry set is associated with a corresponding tournament tier of N tournament tiers for a multilevel autonomous tournament, N is an integer greater than 1, each tournament entry set is associated with a corresponding threshold number of tournament entries for that tournament entry set, and the Nth tournament tier has a single tournament entry set associated therewith; b) receiving, by the tournament server, a plurality of player entry indications for the multilevel autonomous tournament, each player entry indication including information that associates the player entry indication with a particular player identifier; c) associating, for each received player entry indication and by the tournament server, the player identifier associated with that player entry identification with one of the tournament entries of one of the tournament entry sets for the first tournament tier; d) selecting, by the tournament server and for each tournament entry set associated with a tournament tier of the multilevel autonomous tournament other than the Nth tournament tier, after the corresponding threshold number of tournament entries for that tournament entry set have each been associated with a corresponding player identifier, and based at least in part on a random outcome, one or more of the tournament entries for that tournament entry set; e) associating, by the tournament server and for each tournament entry selected in (d), the player identifier associated with that selected tournament entry with a corresponding one of the tournament entries for the tournament entry set or one of the tournament entry sets of the tournament tier one tier higher than the tournament tier of that selected tournament entry; and f) selecting, by the tournament server and after the corresponding threshold number of tournament entries for the tournament entry set associated with the Nth tournament tier have each been associated with a corresponding player identifier, one of the tournament entries of that tournament entry set as a winner of the multilevel autonomous tournament.

In some implementations of the method, the method may further include causing, by the tournament server and for each tournament entry set, a graphical representation of that tournament entry set to be displayed on one or more displays, wherein the graphical representation of each tournament entry set is a wheel divided in to a plurality of segments and each segment of that wheel represents one of the tournament entries for that tournament entry set.

In some implementations of the method in which wheels are used as graphical representations of each tournament entry set, each wheel may have between 6 and 20 segments.

In some implementations of the method in which wheels are used as the graphical representations of each tournament entry set, the wheels all have the same number of segments.

In some implementations of the method, the method may further include performing, by the tournament server, (d) for the tournament entry sets for each tournament tier after player identifiers have been associated with the threshold number of tournament entries for all of the tournament entry sets associated with that tournament tier.

In some implementations of the method, the method may further include performing (d), by the tournament server, for each tournament entry set as the threshold number of tournament entries for that tournament entry set are associated with player identifiers.

In some implementations of the method, the method may further include generating, by the tournament server, the tournament entry sets such that the second through Nth tournament tiers are each associated with a lower number of tournament entry sets than the next lowest tournament tier.

In some implementations of the method, the method may further include performing, by the tournament server, (d) for each of the tournament entry sets associated with the tournament tier or tournament tiers of the multilevel autonomous tournament other than the Nth tournament tier automatically once the player identifiers associated with the tournament entries for that tournament entry set have been associated with the tournament entries for that tournament entry set.

In some implementations of the method, each player entry indication may be indicative of a player associated with the player identifier associated therewith achieving an outcome in a base wagering game that awards an entry into the multilevel autonomous tournament.

In some implementations of the method, the tournament entry sets for the first tournament tier may include a first set of tournament entry sets; each tournament entry set in the first set of tournament entry sets may be associated with a different corresponding set of electronic gaming machines; and the method may further include, for each tournament entry set in the first set of tournament entry sets, only associating, by the tournament server, player identifiers with the tournament entries for that tournament entry set responsive to player entry indications originating from electronic gaming machines in the set of electronic gaming machines corresponding with that tournament entry set.

In some such implementations of the method, each set of electronic gaming machines may be a set of electronic gaming machines that are n a common bank of electronic gaming machines, a set of electronic gaming machines that are in a particular area of a casino, a set of electronic gaming machines that are in a particular casino, or a set of electronic gaming machines that are distributed across a plurality of casinos.

In some implementations of the method, the method may further include i) determining, by the tournament server and for each tournament entry associated with the tournament entry sets associated with the first tournament tier, a score associated therewith; ii) performing, by the tournament server, for each tournament entry set, and after the corresponding threshold number of tournament entries for that tournament entry set have each been associated with a corresponding player identifier, one or more rounds of score modification for that tournament entry set; and iii) causing, by the tournament server, the score, as modified in (2), associated with each tournament entry selected in (d) to also be associated with the tournament entry that is associated in (e) with the player identifier for the tournament entry selected in (d). In such implementations, each round of score modification for a tournament entry set may include: 1) randomly selecting, by the tournament server, one or more of the tournament entries for that tournament entry set, and 2) modifying, by the tournament server, each score associated with the one or more tournament entries selected in (1) by performing an action such as multiplying the score by a multiplier value or adding an additional amount to the score.

In some implementations of the method, the method may further include causing, by the tournament server, a player associated the player identifier associated with the tournament entry that is selected as the winner of the multilevel autonomous tournament in (f) to be awarded a monetary amount proportional to the score associated with that tournament entry.

In some implementations of the method, the method may further include selecting, by the tournament server, the one or more tournament entries in (d) based on the scores, as modified in (2), of the tournament entries within each tournament entry set associated with the tournament tier or tournament tiers of the multilevel autonomous tournament other than the Nth tournament tier.

In some implementations of the method, the method may further include using, by the tournament server, the one or more tournament entries selected in the final round of score modification for each tournament entry set associated with the tournament tier or tournament tiers of the multilevel autonomous tournament other than the Nth tournament tier as the one or more tournament entries selected in (d) for that tournament entry set.

In some implementations of the method, the method may further include randomly selecting, by the tournament server and for each tournament entry selected in (d) and (f), that tournament entry.

In some implementations, a non-transitory computer-readable medium may be provided that stores computer-executable instructions which, when executed by one or more processors of a tournament server, cause the one or more processors of the tournament server to at least: a) generate a plurality of tournament entry sets, wherein each tournament entry set is associated with a corresponding tournament tier of N tournament tiers for a multilevel autonomous tournament, N is an integer greater than 1, each tournament entry set is associated with a corresponding threshold number of tournament entries for that tournament entry set, and the Nth tournament tier has a single tournament entry set associated therewith; b) receive a plurality of player entry indications for the multilevel autonomous tournament, each player entry indication including information that associates the player entry indication with a particular player identifier; c) associate, for each received player entry indication, the player identifier associated with that player entry identification with one of the tournament entries of one of the tournament entry sets for the first tournament tier; d) select, for each tournament entry set associated with a tournament tier of the multilevel autonomous tournament other than the Nth tournament tier, after the corresponding threshold number of tournament entries for that tournament entry set have each been associated with a corresponding player identifier, and based at least in part on a random outcome, one or more of the tournament entries for that tournament entry set; e) associate, for each tournament entry selected in (d), the player identifier associated with that selected tournament entry with a corresponding one of the tournament entries for the tournament entry set or one of the tournament entry sets of the tournament tier one tier higher than the tournament tier of that selected tournament entry; and f) select, after the corresponding threshold number of tournament entries for the tournament entry set associated with the Nth tournament tier have each been associated with a corresponding player identifier, one of the tournament entries of that tournament entry set as a winner of the multilevel autonomous tournament.

In some implementations of the non-transitory computer-readable medium, the non-transitory computer-readable medium may further store additional computer-executable instructions which, when executed by the one or more processors of the tournament server, further cause the one or more processors of the tournament server to at least cause, for each tournament entry set, a graphical representation of that tournament entry set to be displayed on one or more displays, wherein the graphical representation of each tournament entry set is a wheel divided in to a plurality of segments and each segment of that wheel represents one of the tournament entries for that tournament entry set.

In some implementations of the non-transitory computer-readable medium, each wheel may have between 6 and 20 segments.

In some implementations of the non-transitory computer-readable medium, the wheels may all have the same number of segments.

In some implementations of the non-transitory computer-readable medium, the non-transitory computer-readable medium may further store additional computer-executable instructions which, when executed by the one or more processors of the tournament server, further cause the one or more processors of the tournament server to at least perform (d) for the tournament entry sets for each tournament tier after player identifiers have been associated with the threshold number of tournament entries for all of the tournament entry sets associated with that tournament tier.

In some implementations of the non-transitory computer-readable medium, the non-transitory computer-readable medium may further store additional computer-executable instructions which, when executed by the one or more processors of the tournament server, further cause the one or more processors of the tournament server to at least perform (d) for each tournament entry set as the threshold number of tournament entries for that tournament entry set are associated with player identifiers.

In some implementations of the non-transitory computer-readable medium, the non-transitory computer-readable medium may further store additional computer-executable instructions which, when executed by the one or more processors of the tournament server, further cause the one or more processors of the tournament server to at least generate the tournament entry sets such that the second through Nth tournament tiers are each associated with a lower number of tournament entry sets than the next lowest tournament tier.

In some implementations of the non-transitory computer-readable medium, the non-transitory computer-readable medium may further store additional computer-executable instructions which, when executed by the one or more processors of the tournament server, further cause the one or more processors of the tournament server to at least perform (d) for each of the tournament entry sets associated with the tournament tier or tournament tiers of the multilevel autonomous tournament other than the Nth tournament tier automatically once the player identifiers associated with the tournament entries for that tournament entry set have been associated with the tournament entries for that tournament entry set.

In some implementations of the non-transitory computer-readable medium, each player entry indication may be indicative of a player associated with the player identifier associated therewith achieving an outcome in a base wagering game that awards an entry into the multilevel autonomous tournament.

In some implementations of the non-transitory computer-readable medium, the tournament entry sets for the first tournament tier may include a first set of tournament entry sets; each tournament entry set in the first set of tournament entry sets may be associated with a different corresponding set of electronic gaming machines; and the non-transitory computer-readable medium may further store additional computer-executable instructions which, when executed by the one or more processors of the tournament server, further cause the one or more processors of the tournament server to at least, for each tournament entry set in the first set of tournament entry sets, only associate player identifiers with the tournament entries for that tournament entry set responsive to player entry indications originating from electronic gaming machines in the set of electronic gaming machines corresponding with that tournament entry set.

In some implementations of the non-transitory computer-readable medium, where each set of electronic gaming machines is a set of electronic gaming machines that are n a common bank of electronic gaming machines, a set of electronic gaming machines that are in a particular area of a casino, a set of electronic gaming machines that are in a particular casino, or a set of electronic gaming machines that are distributed across a plurality of casinos.

In some implementations of the non-transitory computer-readable medium, the non-transitory computer-readable medium may further store additional computer-executable instructions which, when executed by the one or more processors of the tournament server, further cause the one or more processors of the tournament server to at least: i) determine, for each tournament entry associated with the tournament entry sets associated with the first tournament tier, a score associated therewith; ii) perform, for each tournament entry set and after the corresponding threshold number of tournament entries for that tournament entry set have each been associated with a corresponding player identifier, one or more rounds of score modification for that tournament entry set; and iii) cause the score, as modified in (2), associated with each tournament entry selected in (d) to also be associated with the tournament entry that is associated in (e) with the player identifier for the tournament entry selected in (d). In such implementations, each round of score modification for a tournament entry set may include: 1) randomly selecting one or more of the tournament entries for that tournament entry set, and 2) modifying each score associated with the one or more tournament entries selected in (1) by performing an action such as multiplying the score by a multiplier value or adding an additional amount to the score.

In some implementations of the non-transitory computer-readable medium, the non-transitory computer-readable medium may further store additional computer-executable instructions which, when executed by the one or more processors of the tournament server, further cause the one or more processors of the tournament server to at least cause a player that is associated with the player identifier associated with the tournament entry that is selected as the winner of the multilevel autonomous tournament in (f) to be awarded a monetary amount proportional to the score associated with that tournament entry.

In some implementations of the non-transitory computer-readable medium, the non-transitory computer-readable medium may further store additional computer-executable instructions which, when executed by the one or more processors of the tournament server, further cause the one or more processors of the tournament server to at least select the one or more tournament entries in (d) based on the scores, as modified in (2), of the tournament entries within each tournament entry set associated with the tournament tier or tournament tiers of the multilevel autonomous tournament other than the Nth tournament tier.

In some implementations of the non-transitory computer-readable medium, the non-transitory computer-readable medium may further store additional computer-executable instructions which, when executed by the one or more processors of the tournament server, further cause the one or more processors of the tournament server to at least use the one or more tournament entries selected in the final round of score modification for each tournament entry set associated with the tournament tier or tournament tiers of the multilevel autonomous tournament other than the Nth tournament tier as the one or more tournament entries selected in (d) for that tournament entry set.

In some implementations of the non-transitory computer-readable medium, the non-transitory computer-readable medium may further store additional computer-executable instructions which, when executed by the one or more processors of the tournament server, further cause the one or more processors of the tournament server to at least, for each tournament entry selected in (d) and (f), randomly select that tournament entry.

DETAILED DESCRIPTION

As discussed above, disclosed herein are various techniques and systems for providing MATs, which may generally operate autonomously once a player is entered into such a tournament. Thus, once a player has gained entry into a MAT, they may not need to take any further action with regard to the MAT, usually at least until the MAT nears its ultimate conclusion.

As noted earlier, a computing system may provide an MAT by defining or generating a plurality of tournament entry sets, each tournament entry set having a plurality of tournament entries. The tournament entry sets for a given MAT may, in turn, each be associated with one of a plurality of tournament tiers of the MAT.

As players earn entry into the MAT, e.g., through achieving particular symbol combinations in a base game, they may become associated with a tournament entry that is then associated with one of the first-tier tournament entry set. Once a tournament entry set has been associated with a sufficient number of tournament entries, a selection of one or more tournament entries may be made from the tournament entry set and those selected entries may then be associated with a tournament entry set of the next-highest tier. This may continue until the selections are made of tournament entries from the highest-ranked tournament entry set, at which point a winner or winners may be selected.

Such MAT systems may provide an exciting way for players to participate in tournament-like activities without requiring active participation on the players' parts (unless, in some instances, the MAT requires players making it to the final tier or tiers to attend in person in order to remain in the MAT). Additionally, some MAT implementations may operate on a relatively continuous basis, e.g., as each tournament entry set becomes associated with sufficient tournament entries, a selection of one or more tournament entries may be made for advancement to the next tournament tier. Thus, tournament entry selection events, which may, for example, be represented by a wheel display or similar selection device, may occur on a generally frequent basis, allowing players with interest in the tournament to check in frequently and see how the tournament is progressing.

Various specific details of MATs are discussed below, although a general overview of electronic gaming machines and systems is provided below prior to engaging in extended discussion of MATs.

Figure 1:
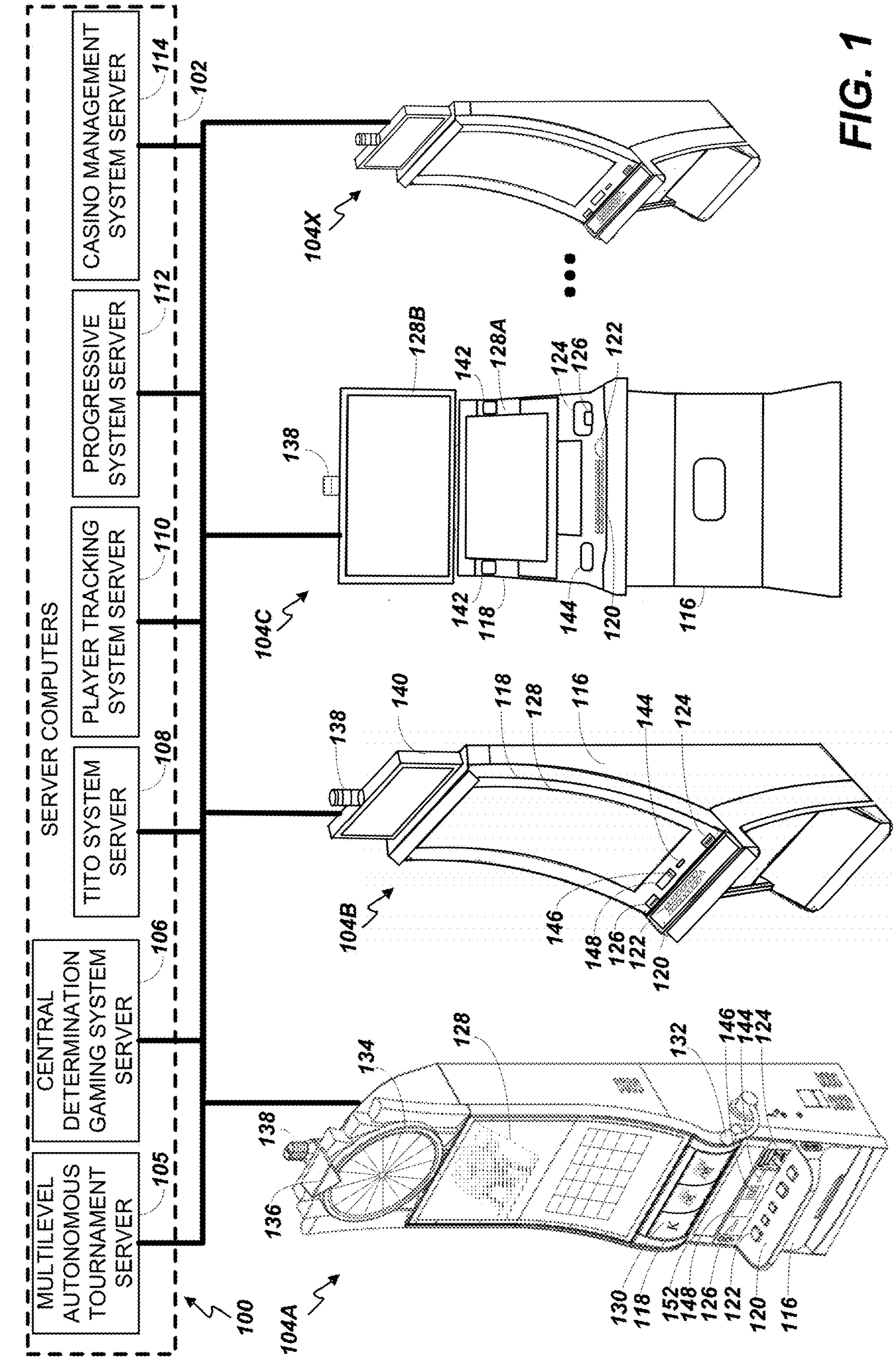
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a multilevel autonomous tournament (MAT) server 105 (which may also be referred to herein simply as a "tournament server"; it will be appreciated that the tournament server (as well as the other servers discussed herein) may include one or more processors, and that in multiple-processor servers, such processors may be contained within a single device or distributed across multiple devices, e.g., a cloud-based implementation), a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2A:
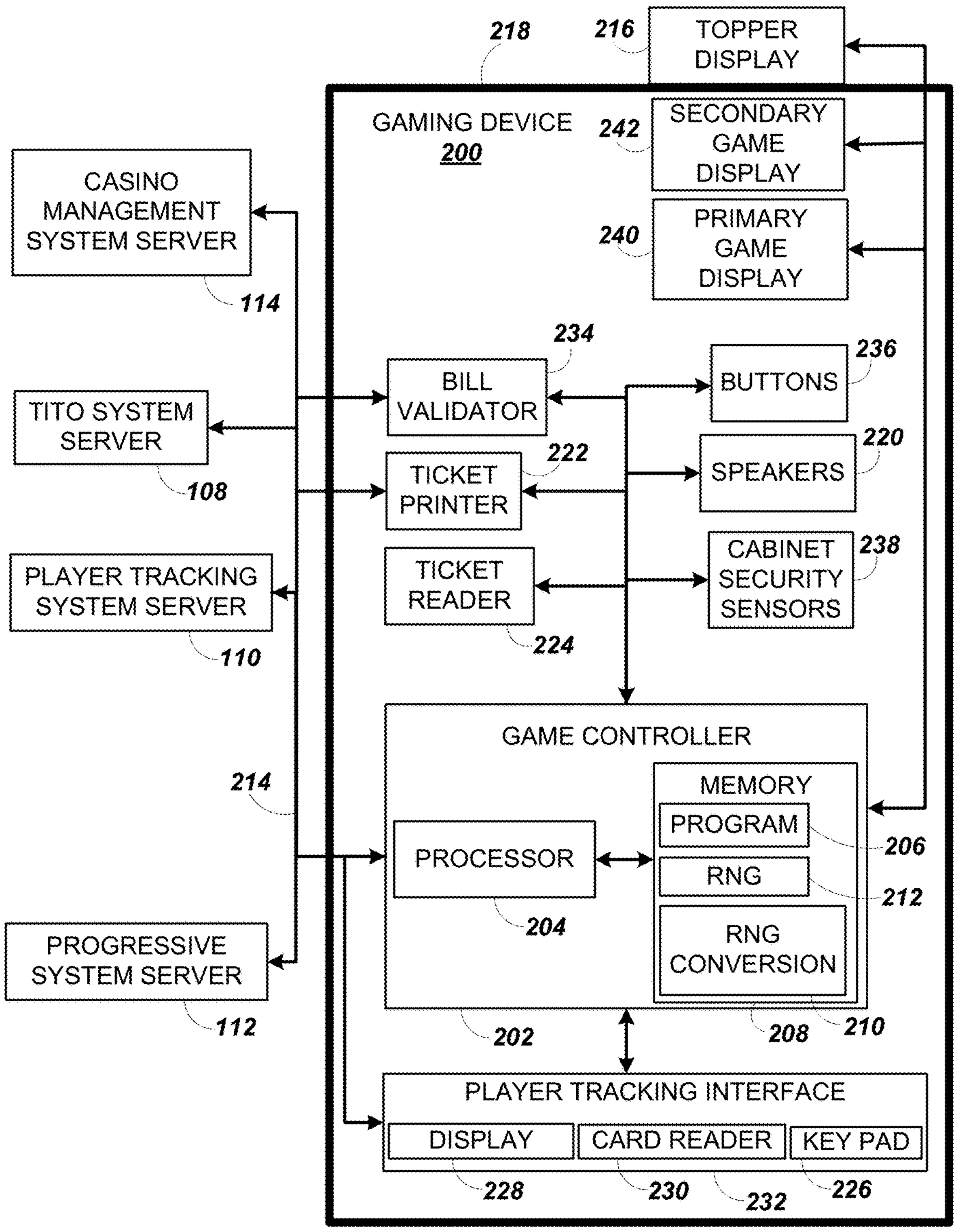
FIG. 2A is a block diagram showing various functional elements of an example EGM.

Many or all the above described components can be controlled by circuitry (e.g., a gaming controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting examples of internal electronic components of a gaming device 200 connected to various external systems. All or parts of the example gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EE-PROM), or other like memory device. Even though FIG. 2A illustrates that game controller 202 includes a single memory 208, game controller 208 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. Game developers could vary the degree of true randomness for each RNG (e.g., pseudorandom) and utilize specific RNGs depending on game requirements.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2 illustrate specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that outputs credits from and/or loads credits onto the gaming device 104A by communicating with a player's smartphone (e.g., a digital wallet interface). Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2A are examples to facilitate ease of description and explanation.

Figure 2B:
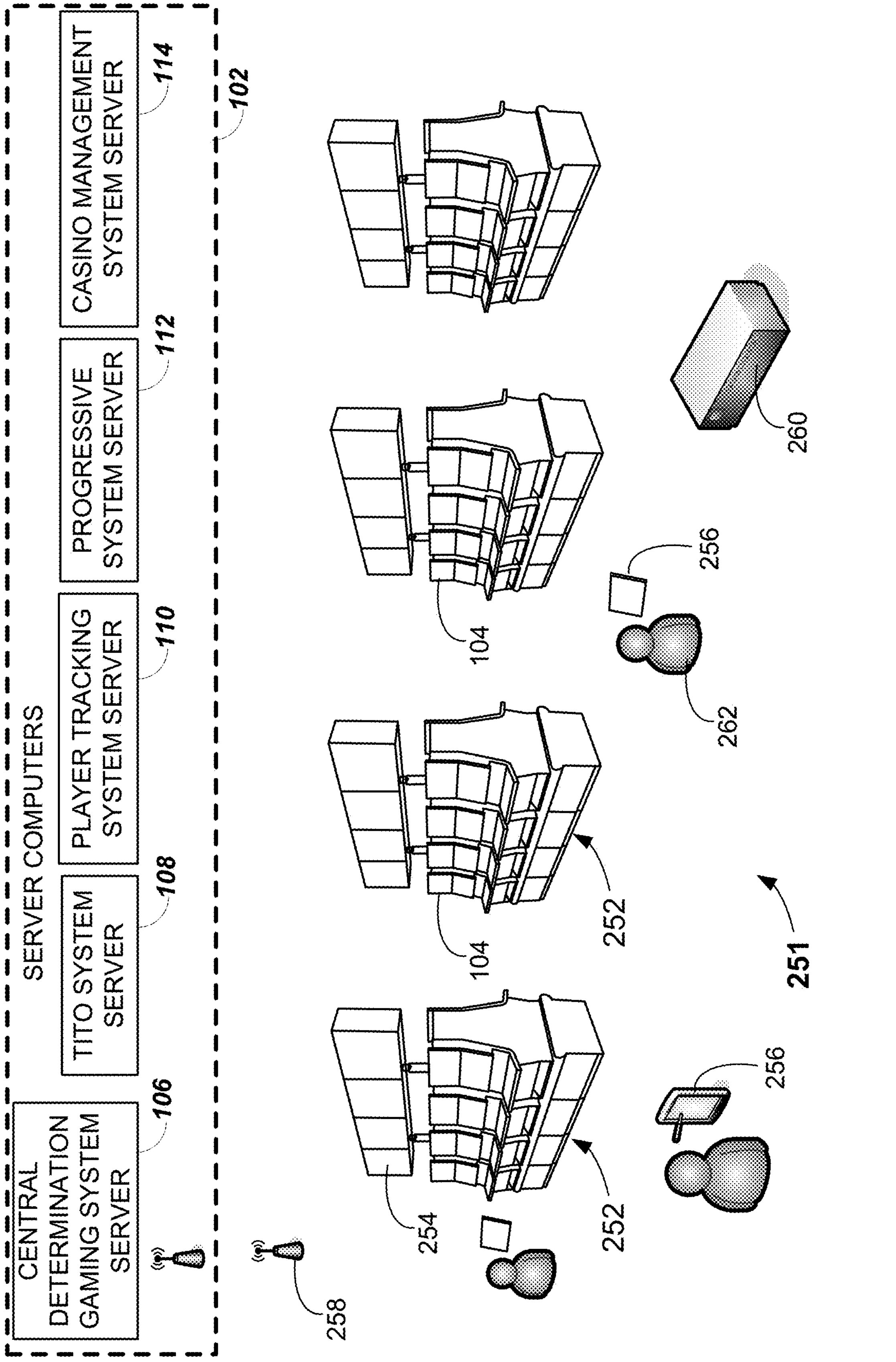
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254. According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
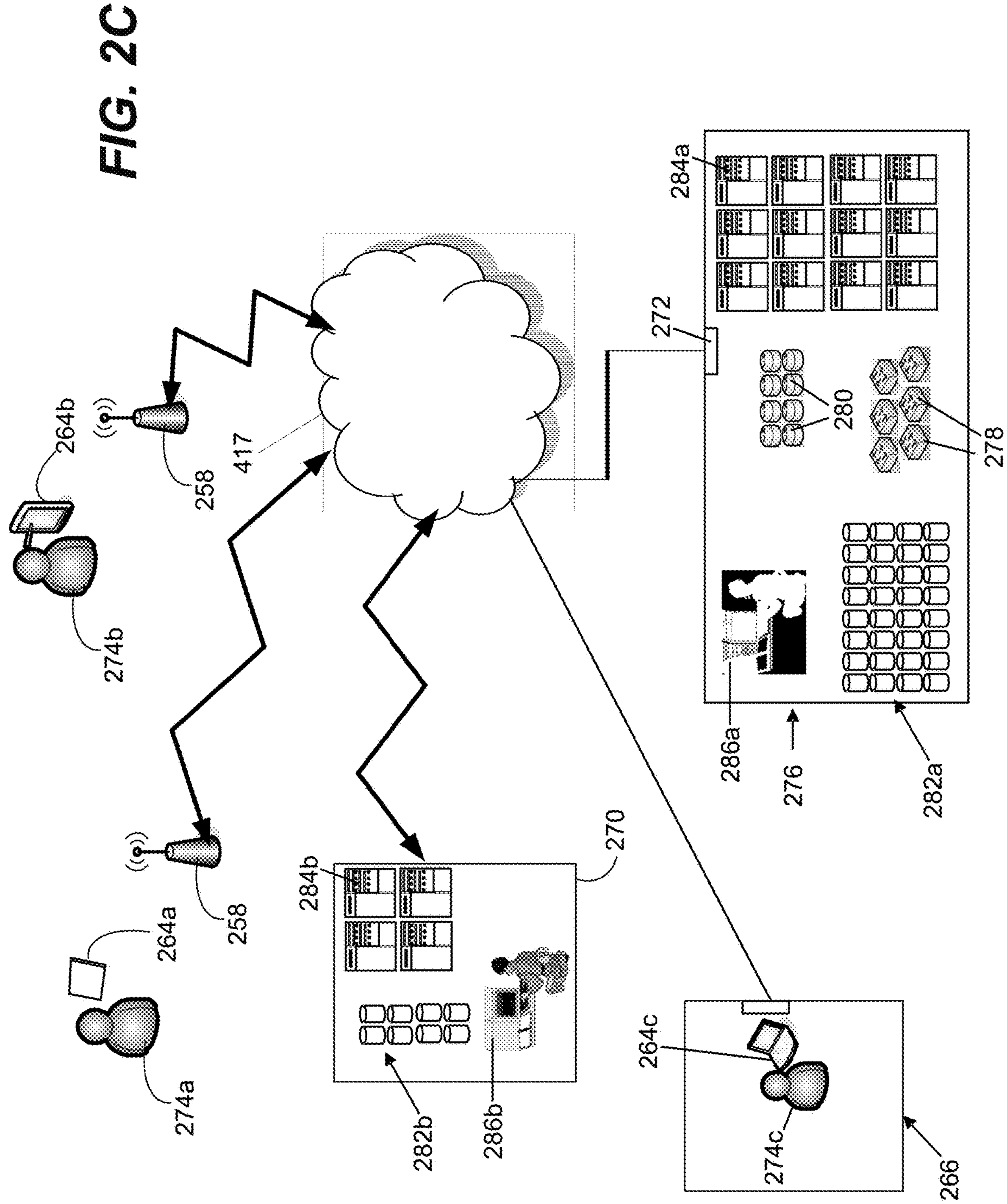
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
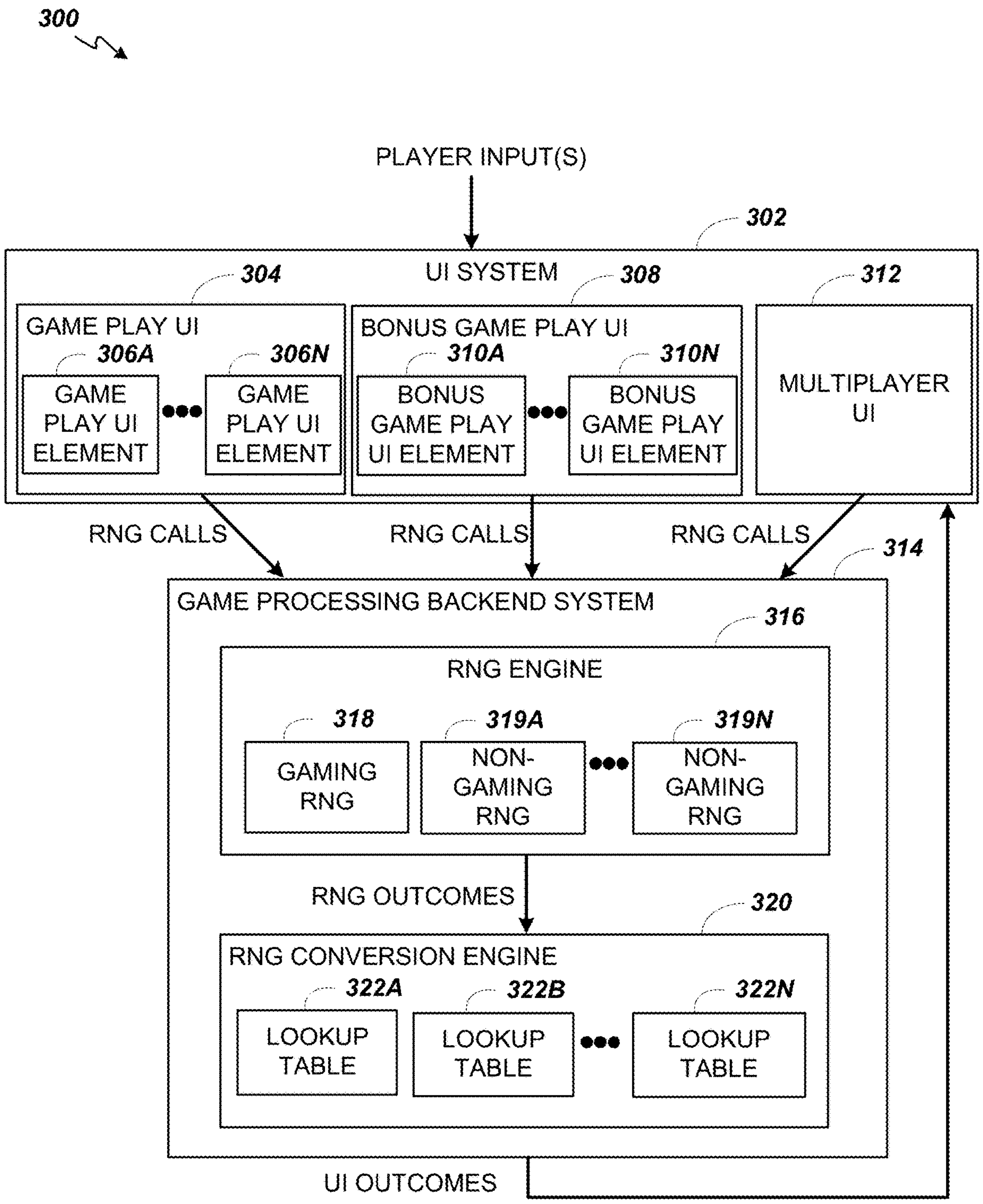
FIG. 3 illustrates, in block diagram form, an embodiment of a game processing architecture algorithm that implements a game processing pipeline for the play of a game in accordance with various embodiments described herein.

FIG. 3 illustrates, in block diagram form, an embodiment of a game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI element 306A-306N are similar to the bonus game play UI elements 310A-310N. In other embodiments, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2. As previously discussed with reference to FIG. 2, gaming RNG 318 often performs specialized and non-generic operations that comply with regulatory and/or game requirements. For example, because of regulation requirements, gaming RNG 318 could be a cryptographic random or pseudorandom number generator (PRNG) (e.g., Fortuna PRNG) that securely produces random numbers for one or more game features. To generate random numbers, gaming RNG 318 could collect random data from various sources of entropy, such as from an operating system (OS). Alternatively, non-gaming RNGs 319A-319N may not be cryptographically secure and/or be computationally less expensive. Non-gaming RNGS 319A-319N can, thus, be used to generate outcomes for non-gaming purposes. As an example, non-gaming RNGs 319A-319N can generate random numbers for such as generating random messages that appear on the gaming device.

The RNG conversion engine 320 processes each RNG outcome from RNG engine 316 and converts the RNG outcome to a UI outcome that is feedback to the UI system 302. With reference to FIG. 2, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

The EGMs and systems discussed above with respect to FIGS. 1-3 may be used as part of a system that may provide MAT functionality. As noted earlier, EGMs may be configured to participate in MATs that are administered by a computing system, which may, for example, be one or more MAT servers, such as MAT server 105 in FIG. 1, which may include one or more processors and one or more memory devices that store computer-executable instructions for causing the one or more processors thereof to perform one or more actions such as are discussed below with regard to administering an MAT.

These and other variations and implementations are discussed below with respect to FIG. 4 onwards.

Figure 4:
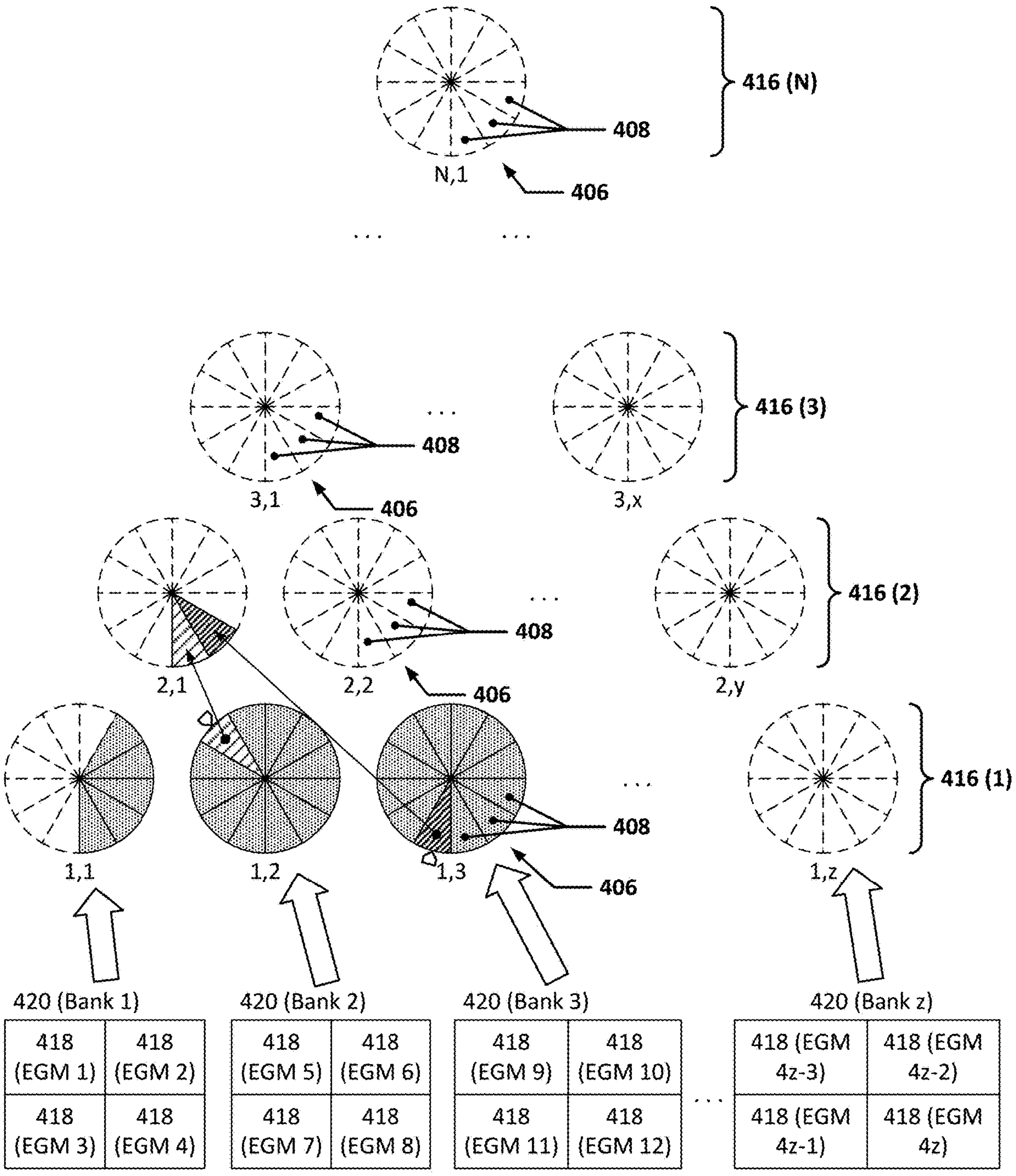
FIG. 4 depicts a representation of an MAT.

FIG. 4 depicts a graphical representation depicting an example of an MAT. In FIG. 4, the MAT 400 is represented by a number of wheel displays 406 arranged hierarchically, with each horizontal row of wheel displays 406 representing a tournament tier 416. While there are at least four tournament tiers 416 depicted, it will be appreciated that there may be any number of tournament tiers in a given MAT. Additionally, while the first tournament tier 416 is shown with only four wheel displays 406, it will be appreciated that the first tournament tier (and higher-ranked tournament tiers) may have a much larger number of tournament entry sets. In particular, MATs may be configured to accept a large number of player entries into a given MAT, e.g., 100,000 player entries, and then rapidly narrow the field of players that progress from each tournament tier to the next.

It will also be appreciated that graphical depictions of the MAT may, as shown in FIG. 4, show only a subset of the graphical constructs representing the tournament entry sets for the MAT. In particular, for MATs that have a large number of tournament entry sets in a given tier, providing simultaneous representations on a display of each graphical construct that represents one of the tournament entry sets may be impractical given the sizes and resolutions of commonly available displays. For example, in an MAT that has 10,000 tournament entry sets associated with the first tournament tier and 10 tournament entries per tournament entry set, representing all of those tournament entry sets with graphical constructs on a single display may be infeasible (the display would need to have sufficient resolution to simultaneously clearly depict 100,000 discrete representations of tournament entries; on a typical 4K display (3840×2160 pixels), each tournament entry would generally be represented by no more than 83 pixels, e.g., a 9×9 pixel region, which would convey little information about the tournament entries in question.

In view of this, the computing system managing the MAT may cause the tournament entry sets, at least for tournament tiers with large numbers of tournament entry sets, to be displayed non-contemporaneously and/or on separate displays. For example, the computing system may cause a device used by each player to display a graphical construct of a tournament entry set that is associated with a tournament entry that is associated with that player; thus, all of the players that are associated with tournament entries associated with the same tournament entry set may all be shown the same graphical construct on the displays of the devices that they are using. As the MAT progresses, i.e., as selections of tournament entries are made from tournament entry sets from higher and higher ranked tournament tiers, the computing system managing the MAT may, in some implementations, cause an increased number of graphical constructs representing tournament entry sets to be displayed on a given display. This may, for example, allow players to observe the outcomes of selections made from tournament entry sets other than the tournament entry set(s) with which those players are associated.

In some implementations, a player may earn multiple entries into the MAT, with each such entry causing the player to be associated with a different tournament entry of one of the tournament entry sets for the first tournament tier 416. In some such implementations, players may even be associated with tournament entries associated with two or more different tournament entry sets. In certain implementations, a player may earn multiple entries to an MAT at different times, e.g., a first entry at a first time and a second entry at a second time which may be after the first time. The ability of each tournament entry to act, in effect, as an autonomous instance of the player associated therewith can participate (perhaps simultaneously) multiple times in a common MAT provides a unique game play experience that may encourage players to engage in activities, e.g., playing wagering games, that may earn them additional tournament entries.

In FIG. 4, for example, the MAT is configured so that each tournament entry set represented by one of the wheel displays 406 in the first tournament tier 416 has players that are associated with the tournament entries thereof based on events that occur on gaming devices, such as electronic gaming machines (EGMs) 418 of a particular bank 420 of EGMs 418. For example, when a player achieves a particular outcome in a wagering game offered on an EGM 418 of the first bank 420, the EGM 418 may cause a message to be sent to the computing system administering the MAT. Such a message may be treated by the computing system as a player entry indication for the MAT and may include information that identifies the player to the computing system (such as a player name, unique identification number, or other identifier), and may then, responsive thereto, associate the player with one of the tournament entries represented by wheel sectors 408.

In FIG. 4, the shaded wheel sectors 408 of each wheel display 406 are wheel sectors 408 that represent tournament entries that have had players associated therewith; wheel display 406 (1,1) has, as can be seen, five of twelve wheel sectors 408 shaded, indicating that five tournament entries of the tournament entry set have been associated with players thus far. Wheel displays 406 (1,2) and (1,3) both have all of their wheel sectors 408 shaded, indicating that all twelve of the tournament entries for each tournament entry set represented by those two wheel displays 406 have been associated with players. It will be appreciated that other numbers of wheel sectors may be used as well, and while the disclosure is not limited to any particular number of wheel sectors, for example, display wheels with between six and twenty wheel sectors may provide an easily-observed set of wheel sectors for players. In this example, the threshold amount of tournament entries of each tournament entry set that is required to be associated with players before selection of one or more tournament entries from the tournament entry set is allowed to commence is equal to the number of tournament entries in each tournament entry set, although it will be understood that in other implementations, the threshold number of tournament entries may be a number less than the number of tournament entries in each tournament entry set.

It will also be understood that while the number of wheel sectors 408 shown in each wheel display 406 shown in FIG. 4 is the same, indicating that each tournament entry set at each tournament tier has the same number of tournament entries, other implementations may have tournament entry sets at different tiers with differing numbers of tournament entries associated therewith. For example, a first tournament tier may have tournament entry sets that each have eight tournament entries associated therewith, a second tournament tier may have tournament entry sets that each have sixteen tournament entries associated therewith, a third tournament tier may have tournament entry sets that each have thirty-two tournament entries associated therewith, a fourth tournament tier may have tournament entry sets that each have sixty-four tournament entries associated therewith, and a fifth tournament tier may have tournament entry sets that each have one hundred and twenty-eight tournament entries associated therewith. Thus, as players advance to higher-level tournament tiers, their chances of advancing to the next highest tournament tier may decrease. In other implementations, a similar, but reversed, progression may occur, e.g., as tournament tiers increase in level, the number of tournament entries associated with tournament entry sets associated therewith may increase as well.

Once a tournament entry set has had the threshold number of tournament entries associated with players, the computing system may allow selection of one or more tournament entries from the tournament entry set to occur. For example, in FIG. 4, selection of a wheel sector 408 of each wheel display 406 (1,2) and (1,3) has occurred, as indicated by the diagonal-hatched wheel sectors 408. The players associated with the tournament entries being represented by the diagonal-hatched wheel sectors 408 are then associated by the computing system with tournament entries in the tournament entry set represented by the wheel display 406 (2,1), as shown by the diagonal-hatched wheel sectors 408 of the wheel display 406 (2,1). After the tournament set represented by the wheel display 406 (1,1) has had the remaining seven tournament entries represented by the wheel sectors 408 shown in dashed lines associated with players, then a tournament entry may be selected from the tournament entry set represented by the wheel display 408 (1,1) and the player associated therewith may then be associated with a tournament entry associated with the tournament entry set represented by the wheel display 406 (2,1).

In this example, there are only four EGMs 418 per bank of EGMs and since each bank 420 of EGMs 418 may provide player entry indications to the computing system for a single tournament entry set having twelve tournament entries associated therewith, multiple player entry indications may be provided by a single EGM 418 in one of the banks 420 to the corresponding tournament entry set. Thus, a player that earns multiple outcomes on an EGM 418 of one of the banks 420 that each cause a player entry indication to be sent to the computing system managing the MAT may be associated with a corresponding number of tournament entries in the tournament entry set that corresponds to that bank 420 of EGMs 418. This may have the effect of causing that player to, for example, have an increased chance of being selected when selection of tournament entries from the corresponding tournament entry set occurs. Moreover, if a player is associated with a tournament entry in one tournament entry set as a result of achieving an outcome on a particular bank 420 of EGMs 418 and then achieves another such outcome when playing on one or more other banks 420 of EGMs 418, then the player may be associated with tournament entries in two or more tournament entry sets. It will be appreciated, however, that other implementations may use banks 420 of more or fewer EGMs 418, or may allow player entry indications from other groupings of EGMs or other devices to cause a player to be associated with a tournament entry.

As noted earlier, the selection of tournament entries from the tournament entry sets of a given tournament tier 416 may occur according to a variety of timelines depending on the implementations. It will also be appreciated that selection of tournament entries may occur using a variety of techniques, although the techniques may, as noted earlier, generally share the common attribute of being based on a random outcome and not requiring further player action in order to occur (aside from instances in which the players from higher-ranked tournament tiers may be required to physically participate in some manner, e.g., attend a selection event).

In some implementations, the computing system may cause one or more of the tournament entries of each tournament entry set to be selected at random. In another implementation, the computing system may cause multiple rounds of preliminary selections of one or more tournament entries to be made from each tournament entry set, with the selection of the one or more tournament entries that will have the players associated therewith associated with tournament entries associated with a tournament entry set of the next-highest tournament tier being determined based on those preliminary selections.

For example, in some implementations, each preliminary selection may be made in association with a quantity, e.g., a quantity of points, a score multiplier, a quantity of credits, etc. Each time a tournament entry is selected as a preliminary selection, a numeric quantity associated therewith may be modified based on the quantity associated with the preliminary selection. In the case of score multipliers, a score associated with a preliminarily selected tournament entry may be multiplied by such a score multiplier; for quantities such as a quantity of points or a quantity of credits, the quantity may simply be added to the existing score. For example, the selection technique may involve performing five rounds of preliminary selection in which each round of preliminary selection may result in selection of a single tournament entry; each tournament entry of the tournament entry sets of the first tournament tier, in this example, may have a base score of 10 associated with it after a player is associated therewith. In the first round of preliminary selection, a score multiplier of 2× may be applied to the score associated with the tournament entry that is preliminarily selected. In the second round of preliminary selection, a score multiplier of 3× may be applied to the score associated with the tournament entry that is preliminarily selected. In the third round of preliminary selection, a score multiplier of 4× may be applied to the score associated with the tournament entry that is preliminarily selected. In the fourth round of preliminary selection, a score multiplier of 5× may be applied to the score associated with the tournament entry that is preliminarily selected, and in the last round of preliminary selection, a score multiplier of 10× may be applied to the score associated with the tournament entry that is preliminarily selected. If a tournament entry is preliminarily selected more than once within the five rounds, then the score multipliers that are applied may be multiplied together. For example, if a tournament entry is preliminarily selected in the first and fourth rounds of preliminary selection, then the score multiplier for that tournament entry may, at the conclusion of the preliminary selection routine, be 8× (which equals 2× multiplied by 4×). In some implementations, the computing system may then select the one or more tournament entries that will have the players associated therewith associated with tournament entries associated with a tournament entry set of the next-highest tournament tier by, for example, selecting the tournament entry that has the highest score associated therewith (after applying any multipliers earned through the preliminary selection events). In alternative implementations, the computing system may instead simply select the one or more tournament entries that will have the players associated therewith associated with tournament entries associated with a tournament entry set of the next-highest tournament tier by, for example, selecting the tournament entry that was selected in the last round of preliminary selection (this avoids the possibility that a potential tie between modified scores might need to be addressed in some manner, e.g., by a further preliminary selection or other mechanism, prior to selecting the tournament entry that will be associated with a tournament entry in the next-highest tournament tier).

In some implementations, the score that is associated with each tournament entry associated with a tournament entry set associated with the first tournament tier may be based on a wager made by the player associated therewith. For example, if a player is playing a base game that may generate outcomes that lead to player entry indications being provided to the computing system to cause that player to be entered into the MAT, whatever wager that player may have made in the base game that led to such an outcome may be used to determine the score that is associated with the tournament entry that they are associated with. For example, if the base game allows wagers of 1 credit, 2 credits, or 3 credits, the base score that is associated with the tournament entry of the first tournament tier that the player is associated with may be 10, 20, or 30 (or 1, 2, or 3, for example). Thus, in some such implementations, a higher wager in the base game may provide an advantage to the player in the MAT in the form of higher score.

In some implementations, the base score that is subject to modification via the preliminary selections for a tournament entry set may be player-specific rather than tournament entry-specific. For example, if a player is associated with multiple tournament entries in a tournament entry set, the scores associated with those tournament entries may be treated as a unitary, aggregate score for the purposes of score modification. For example, if a player is associated with four tournament entries in a tournament entry set and those tournament entries are, in turn, associated with scores of 10, 10, 30, and 20, respectively, preliminary selection of any of those tournament entries may cause whatever score modification is associated therewith to be applied to the sum of those scores, e.g., 70, regardless of which particular tournament entry is selected. In other implementations, each tournament entry may be treated as a stand-alone entity, even if the same player is associated with two or more tournament entries within the same tournament entry set. In such implementations, for example, the above scenario would cause the score modification to be applied to only the score associated with the tournament entry that is subject to preliminary selection.

In some implementations that utilize a score that is associated with each tournament entry, the score may be carried forward in its modified form to subsequent tournament entries that are associated with the same player as a result of the selection of the tournament entry in a prior tournament tier. For example, if a first tournament tier-level tournament entry with a base score of 10 is preliminarily selected and the base score of 10 is modified to be 30 through the application of a 3× multiplier, the score that would be associated with a second tournament tier-level tournament entry as a result of the selection of that first tournament tier-level tournament entry would be 30. In other such implementations, the score that is carried forward to the subsequent tournament entries may be re-set each time. For example, in the previous scenario, the score that would be associated with the second tournament tier-level tournament entry as a result of the selection of that first tournament tier-level tournament entry would be re-set to 10. The latter scenario avoids situations where a player that was particularly lucky in a previous tournament tier enters the subsequent tournament tier with an outsized advantage compared to the other players in that subsequent tournament tier.

MATs may award prizes to one or more players at various times. For example, the computing system administering an MAT may award a prize to a player that is selected as the MAT winner from the tournament entry set of the highest tournament tier of such an MAT. Such a prize may, in some implementations, be determined based on a score that is associated with the selected tournament entry associated with that player. For example, the score, as modified by any preliminary selection events, may be carried forward to each subsequent tournament entry that a player is associated with and, as a result, may have had multiple score multipliers applied to it—this modified score, as it stands when the player is selected as the MAT winner, may, in some cases, be used as the award amount that the MAT winner is awarded. For example, if the winner of an MAT started with a base score of 2 and had score multipliers in the first tournament tier of 2× and 3× applied to their associated tournament entry, a score multiplier of 10× applied to their associated tournament entry in the second tournament tier, further score multipliers of 2× and 5× applied to their associated tournament entry in the third tournament tier, additional score multipliers of 3× and 4× applied to their associated tournament entry in the fourth tournament tier, and final score multipliers of 2× and 10× applied to their associated tournament entry in the fifth and final tournament tier, the player's score (and award amount) in such an MAT would be $2\cdot(2.3)\cdot(10)\cdot(2.5)\cdot(3.4)\cdot(2.10)=288{,}000$ (the award amount may, for example, be the same as the score amount, but may also be subject to a conversion rate, e.g., 1 score point may equal one cent, in which case the award amount would be $2880 in this example).

In other implementations, the amount awarded to an MAT winner may be a fixed amount, an amount funded by a progressive system, an amount based on a percentage of the total base scores associated with the tournament entries of the first tournament tier for that MAT, or another amount.

In some implementations, more than one tournament entry may be selected as an MAT winner, in which case there may be multiple levels of MAT winner, e.g., a first place winner, a second place winner, a third place winner, etc. Each such winner may be awarded an award amount commensurate with their placement by the computing system administering the MAT.

In some implementations, amounts may be awarded to players by the computing system administering an MAT at various points during the MAT, e.g., in association with the conclusion of each non-final tournament tier (when all tournament entry selections for that tournament tier have been made) or in association with the conclusion of each tournament entry selection for a given non-final tournament tier (it will be understood, however, that such techniques may also, in some implementations, be implemented for the final tournament tier as well). For example, an MAT may be configured such that the computing system administering the MAT allocates different pools of credits to different tournament tiers of the MAT and then apportions those pools of credits among the players associated with the tournament entries associated with the tournament entry sets for that tournament tier that are selected for advancement to the next tournament tier. For example, such apportionment may, in some implementations, simply be in equal parts, e.g., if there are X tournament entry sets in a given tournament tier, then the amount allocated as an award amount for that tournament tier may be divided into X equal shares and each such share awarded to the player associated with the tournament entry selected from each tournament entry set for that tournament tier. In other implementations, the apportionment may be based on a score associated with the tournament entry selected from each tournament entry set of the tournament tier. For example, if a tournament entry associated with a score of 1220 is selected from a tournament entry set of a particular tournament tier and the total amount of scores for all of the selected tournament entries for that particular tournament tier is 802,640, then the portion of the award amount allocated to that particular tournament tier that may be awarded to the player associated with the tournament entry associated with the score of 1220 would be awarded 1220/802,640=0.0015 of that allocated award amount.

While the above discussion provides a broad overview of various implementations of MATs, additional discussion is provided below with respect to FIGS. 5 and 6, which outline various techniques that may be implemented by a computing system for administering and managing MATs. These techniques are generally discussed with regard to the back-end management of the MAT and do not focus on the graphical depiction of various stages of the MAT that may also be provided in tandem with these techniques. Generally speaking, it will be understood that the various selection operations and association of players with different tournament entries may be represented graphically as discussed above, e.g., using wheel displays, reel displays, or other suitable graphical constructs.

Figure 5:
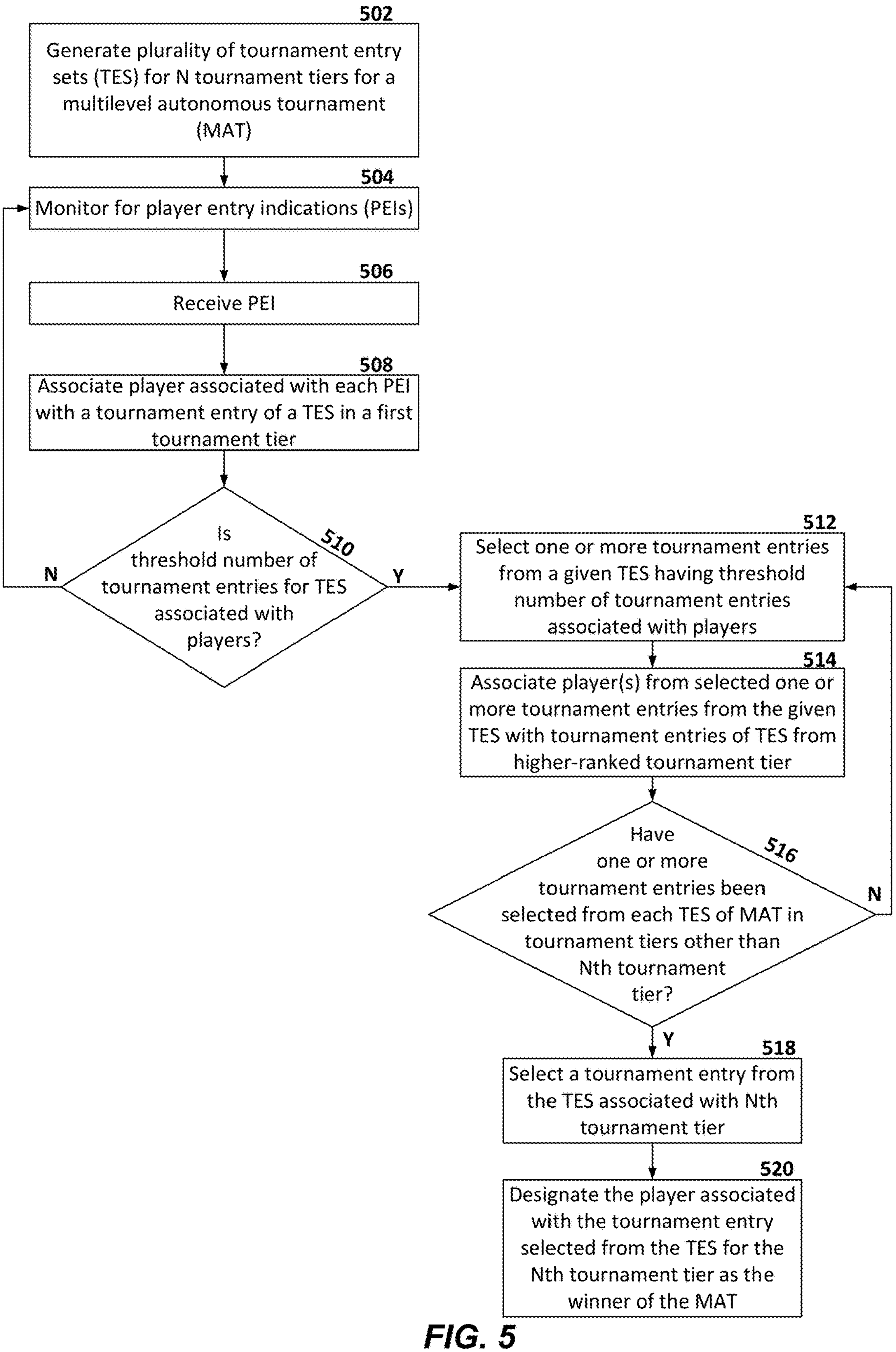
FIG. 5 depicts a technique for administering an MAT.

FIG. 5 depicts an overview of a technique for administering an example MAT such as an MAT discussed above. In FIG. 5, the technique may begin in block 502, where a computing system that is configured to administer the example MAT may generate a plurality of tournament entry sets (TESs) for N tournament tiers of an MAT. In some implementations, the number of TESs and/or tournament tiers may be known at the start of an MAT, whereas in other implementations, the number of TESs and/or tournament tiers may be determined dynamically, e.g., as the MAT progresses, and/or on an as-needed basis. Each tournament entry set may, for example, be represented by an instance of a tournament entry set object or similar data structure that, itself, may reference a plurality of instances of a tournament entry object, each of which may store information regarding a particular player associated therewith (and, if the MAT involves maintaining a player score, information regarding a score associated with that player).

In block 504, the computing system may monitor for player entry indications, e.g., messages that may be received from EGMs being played by potential MAT participants. Such player entry indications may also, or alternatively, originate from other equipment, such as players' mobile devices, depending on the particular implementation. For example, in some implementations, an MAT may be provided in a social gaming context in which players may earn social gaming credits (or other credits that are generally not redeemable for actual money), such as in social gaming apps that may be provided for play on players' mobile phones. Each player indication may, for example, be triggered by a player associated therewith in response to that player achieving a particular outcome on an EGM or other device. For example, if a player obtains a particular outcome on such a device, the device in question may send out a message, e.g., a player entry indication (PEI), to the computing system, e.g., via a network interface or other communications interface, that indicates that such an outcome has been achieved. The PEI may also include information that in some way identifies the player and may also provide information that allows initial determination of a score to be associated with the tournament entry with which that player will be associated. For example, a player tracking system 110 may identify the player and send that identification information to the MAT server 105.

The computing system, on receipt of such a PEI in block 506, may then, in turn, cause the player associated with the PEI to be associated with a tournament entry for a TES of a first tournament tier of the MAT in block 508, e.g., a player ID number may be stored in an appropriate field of an instance of a tournament entry object that is, itself, associated with an instance of a tournament entry set object representing that TES. The process may then return to block 504 where the computing system may monitor for further PEIs. The technique may also evaluate in block 510 whether the TES having the tournament entry with which the player was associated in block 508 has a threshold number of tournament entries having players associated therewith. As noted earlier, the threshold number of tournament entries having players associated therewith for a given TES may, in most implementations, be equal to the number of tournament entries that are in the TES, although other implementations may involve a threshold number that is less than this number.

Once a determination has been made in block 510 that the threshold number of tournament entries for a particular TES have had players associated therewith, that particular TES may be determined to be in a state that permits the computing system to proceed with selecting one or more tournament entries therefrom, e.g., such as may be performed in block 512. It will be understood that selection of one or more tournament entries from a particular TES may, in some instances, involve selecting only a single tournament entry from such a TES, but may alternatively involve selecting, in other instances, multiple tournament entries from such a TES. It will be further appreciated that the number of tournament entries selected from TES's of different levels for a given MAT may vary depending on the level of the TES in question, e.g., lower-level TES's may have multiple tournament entries selected therefrom (thus reducing the chance of early elimination for each TES) and higher-level TES's may have reduced numbers of tournament entries, or only a single tournament entry, selected therefrom. It will also be understood that while FIG. 5 depicts the performance of 512 as possibly occurring as a result of each determination 510 that results in a "true" outcome, other implementations may take a different approach. For example, in some implementations, the computing system may cause block 512 to be performed for multiple TESs generally simultaneously or in rapid succession, but according to a predetermined schedule. In such instances, a determination may be made prior to such a round of selections as to which of the TESs of the first tier have had the requisite threshold number of tournament entries associated with players; the computing system may then cause block 512 to be performed for all of the TESs that met this criteria at the schedule time. In some implementations, the computing system may cause notifications to be sent to the players that are associated with the tournament entries of a particular TES that is to be processed according to block 512 in advance of such processing; such notifications may include information alerting those players that a selection event will occur at a particular indicated time, thereby allowing those players to view, for example, a display that may graphically depict the selection process and selection outcome. In other implementations, the computing system may simply store the results of the selection process and may then depict a graphical representation of the selection process on-demand to players that are associated with tournament entries of a TES subject to the selection process. Such an implementation may allow each player to observe the outcome of such a selection process according to their own timetable.

The selection of one or more tournament entries in block 512 may, as discussed earlier, generally be based, at least in part, on a random outcome. Various techniques for selecting one or more tournament entries are discussed in more detail with regard to FIG. 6, which is discussed later.

In block 514, the player or players associated with the tournament entry or entries that are selected from a tournament entry set in block 512 may be associated with a tournament entry of a tournament entry set in the next highest level or next highest ranked tournament tier (with a numerically larger tournament tier being viewed as being ranked higher than a numerically smaller tournament tier, e.g., a second tournament tier would be ranked higher than a first tournament tier) than the tournament tier of the tournament entry set from which the tournament entry was selected in 512.

In block 516, a determination may be made as to whether one or more tournament entries have been selected from each tournament entry set of each tournament tier other than that of the highest-ranked, or Nth, tournament tier. If not, then the technique may return to block 512 for further selection of tournament entries, as discussed above. If so, then the computing system may proceed to block 518, in which a selection a tournament entry may be made from the tournament entry set associated with the Nth tournament tier. Such a selection may be made in a manner similar to that used in block 512 in some implementations. In block 518, the player associated with the tournament entry selected in 518 may be designated as the MAT winner and, if applicable, provided with a corresponding award.

Figure 6:
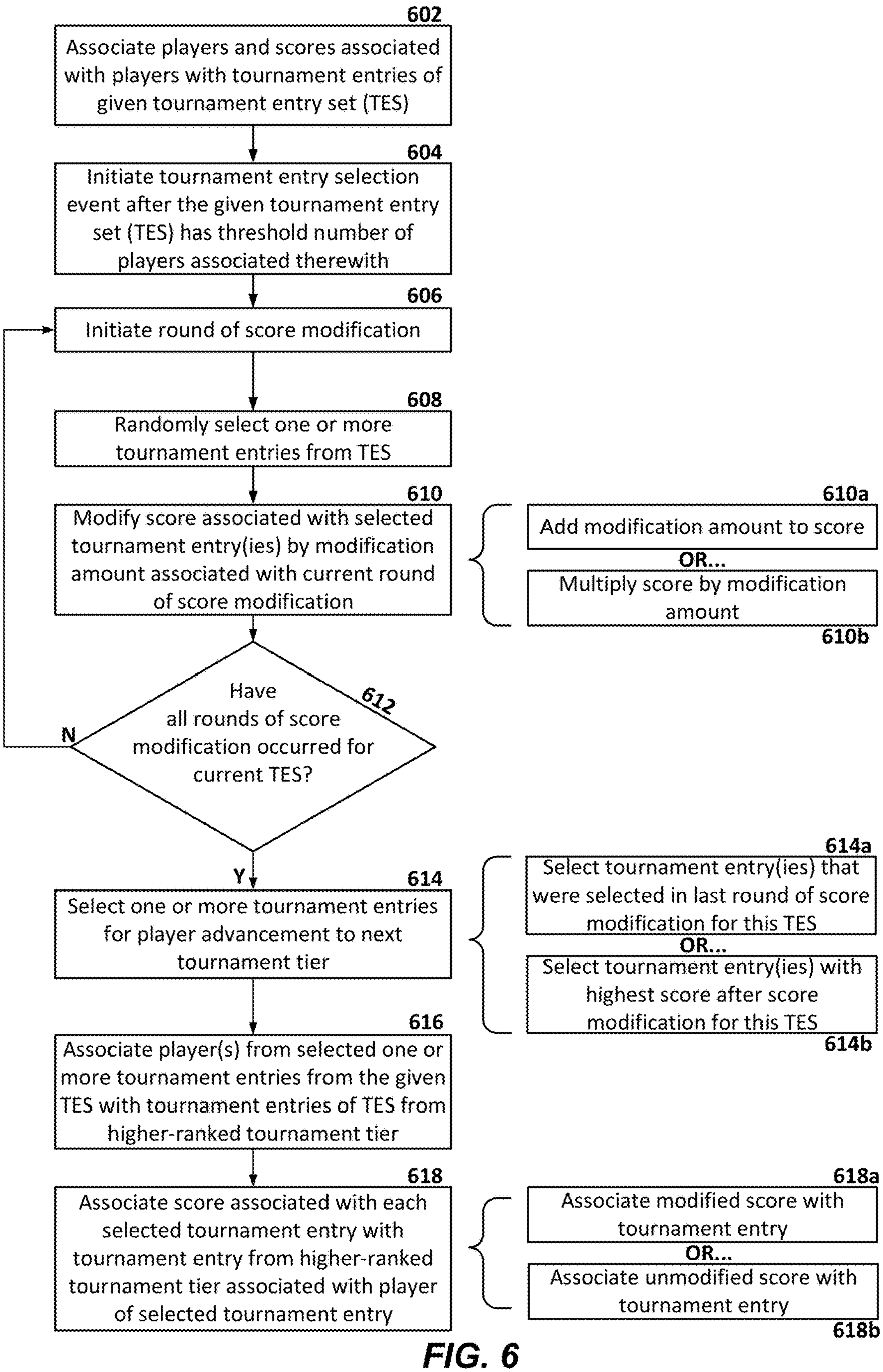
FIG. 6 depicts a technique for selecting a tournament entry for an MAT.

FIG. 6 depicts a technique for performing tournament entry selection, such as is referenced with regard to blocks 512 and 518. In FIG. 6, players and scores associated with those players may be associated with tournament entries of a given tournament entry set in block 602. In block 604, it may be determined that a tournament entry selection event is to occur for the given tournament entry set. In the depicted tournament entry selection technique of FIG. 6, the tournament entry selection technique may involve one or more rounds of score modification; in other techniques, the tournament entry selection technique may simply involve a random selection of one or more tournament entries from the tournament entry set without any score modification being performed.

In block 606, a round of score modification may be initiated; each round of score modification may involve a preliminary selection of a tournament entry, as discussed earlier. The computing system may then randomly preliminarily select one or more tournament entries from the tournament entry set in block 608. In block 610, the computing system may then modify the score associated with each preliminarily selected tournament entry by a modification amount. As discussed earlier, such a modification amount may be either additive or multiplicative. For example, if block 610 involves an additive modification amount, the score associated with the preliminarily selected tournament entry may be modified per block 610*a*, in which the modification amount may be added to the score associated with the preliminarily selected tournament entry. Conversely, if block 610 involves a multiplicative modification amount, the score associated with the preliminarily selected tournament entry may be modified per block 610*b*, in which the score associated with the preliminarily selected tournament entry may be multiplied by the modification amount.

In block 612, a determination may be made as to whether all rounds of score modification have occurred for the given tournament entry set. For example, there may be multiple rounds of score modification for the given tournament entry set. In some implementations, there may only be a single round of score modification for the given tournament entry set, but in other implementations, there may be multiple rounds of score modification for a given tournament entry set. It will be understood that in some implementations, the number of tournament modification rounds and/or type of score modification (multiplicative v. additive) of each score modification round may differ between the tournament entry sets for different tournament tiers, or even within the tournament entry sets of the same tournament tier. For example, the number of score modification rounds that may be implemented for a given tournament entry set may be based on the total of all of the scores associated with the tournament entries of that tournament entry set. For example, for one example first tier tournament set, players may, as discussed earlier, have a point value associated with their wager amount in a base game associated with the tournament entry with which they are associated in a tournament entry set. In some such instances, the rounds of score modification that may be performed on such a tournament entry set may be dependent on the total of the scores based on those wager amounts. For example, if more higher-value wagers are placed, this may raise the total score of the tournament entry set; if the total score reaches a first threshold level, then a first number of score modification rounds may be performed; if the score reaches a second threshold level, then a second number of score modification rounds (higher than the first number) may be performed. Similarly, if the total score does not reach or exceed the first threshold level, then a default number of score modification rounds (lower than the first number) may be performed.

Various score modification paradigms may be used in an MAT in various scenarios. In some instances, each tournament entry may only be eligible to be preliminarily selected a single time during the multiple rounds of score modification that may be performed as part of the selection of tournament entries that may be advanced to the next tournament tier. For example, in some variants, multiple tournament entries, e.g., three tournament entries, from a given tournament entry set may be preliminarily selected for advancement to the next tournament tier. Each such tournament entry may, after being selected during score modification, be guaranteed advancement to the next tournament tier and may, in some implementations, be disqualified from further selection during score modification for that tournament entry set. This may avoid a scenario where a predetermined number of tournament entries—matching the number of score enhancement rounds for a tournament entry set—are expected to be advanced to a tournament entry set of the next tournament tier from that tournament entry set, but, due to one such tournament entry being selected multiple times during the score modification rounds for that tournament entry set, the number of unique tournament entries that are advanced to the next tier tournament entry set is lower than the predetermined number of tournament entries that are expected to be advanced. This may, in some instances, cause the next-tier tournament entry set to never reach the state where it is deemed that the threshold number of tournament entries for that tournament entry set have had players associated therewith, which may cause the MAT to experience an error (or simply never complete). In some such scenarios, the score modifications applied to preliminarily selected tournament entry may be different, e.g., escalating in effect. For example, if there are three rounds of score modification for a given tournament entry set, the tournament entry selected in the first round may have a 2× score multiplier applied to the score associated therewith, the tournament entry selected in the second round may have a 3× score multiplier applied to the score associated therewith, and the tournament entry selected in the third round may have a 4× score multiplier applied to the score associated therewith—thus, all three preliminarily selected tournament entries may be advanced to a tournament entry set of the next tournament tier, but each may also be subjected to a different amount of score modification.

In a variant of such a score modification scenario, some of the score modifications that are applied to scores associated with preliminarily selected tournament entries may actually cause those scores to decrease in value. For example, there may be three rounds of score modification for a given tournament entry set, with all three tournament entries that are selected being advanced on to a tournament entry set of the next tournament tier. The tournament entry that is selected in the first round of score modification may, for example, be subjected to a 0.5× score multiplier, which would reduce the score associated with that preliminarily selected tournament entry by 50%—while this seems undesirable, that tournament entry would still be advanced to a tournament entry set of the next tournament tier, which would generally be more desirable than possibly not advancing to the next tournament tier at all. The tournament entry set that is selected in the second round of score modification may, for example, be subjected to a 1× score multiplier (it will be understood that some score modification effects may leave a "modified" score unchanged in some implementations), and the tournament entry set that is selected in the third round of score modification may, for example, be subjected to a 2× score multiplier. Thus, one player will progress to the next tournament tier but pay a penalty in terms of their score for the privilege of doing so, another player will progress to the next tournament tier without any change in their score, and yet another player will progress to the next tournament tier and see their score increase. It will be understood that such a scenario may include preliminary selections of more or fewer than three tournament entries, and that varying types of score modification, including no-change score modification as well as score modifications that increase or decrease a score associated with a preliminarily selected tournament entry, may be applied in association with each such preliminary selection.

In some such implementations, multiple score modification rounds may be implemented for each tournament entry set and each tournament entry in a tournament entry set may only be eligible to be preliminarily selected in a single such round of score modification for that tournament entry set, but fewer tournament entries may be preliminarily selected from that tournament entry set to advance to the next tier of the MAT than are preliminarily selected during the score modification rounds for that tournament entry set. In some such implementations, for example, there may be multiple, e.g., 3, rounds of score modification, with the tournament entry that is preliminarily selected in each of those score modification rounds having different multiplier value applied to the score associated therewith. One or more of the tournament entries, e.g., the tournament entry selected in the last round of score modification in this example, may be advanced to the next tier of the MAT; in some such implementations, the player(s) associated with the tournament entry or entries that are advanced to the next tier of the MAT may be provided with a prize or award that is based on the score(s) associated with that tournament entry or tournament entries. The remaining tournament entries that were preliminarily selected but not advanced to the next tier of the MAT, e.g., the tournament entries preliminarily selected in the first two rounds of score modification in this example, may be eliminated from the MAT. In some such implementations, the players associated with eliminated tournament entries may be provided with an award or prize that is based on the modified scores for those tournament entries at the time they were eliminated. For example, the scores may represent a monetary amount, e.g., dollars or cents, and the players receiving awards or prizes based on scores associated with tournament entries may get a payout of that monetary amount. Moreover, in some implementations, tournament entries for a given tournament entry set that are not preliminarily selected at all during the score modification rounds for that tournament entry set may be either eliminated from the MAT without any corresponding payout or prize award or may, as with those tournament entries that are preliminarily selected in one of the score modification rounds for that tournament entry set in some implementations, be awarded a payout or prize award that is based on the scores associated therewith at the time those tournament entries are eliminated.

It will also be appreciated that equivalent scenarios may be implemented using MAT systems in which the same tournament entry may be preliminarily selected more than once during score modification rounds for a given tournament entry set. In some such implementations, tournament entries that are preliminarily selected more than once may, if such selection qualifies them to advance to the next tournament tier, be assigned to multiple positions of a tournament entry set. For example, if a particular tournament entry is selected twice during preliminary selection for score modification, then that tournament entry may, in some implementations, be associated with two different tournament entry slots or positions in a tournament entry set of the next tournament tier. Thus, if the tournament entry set of the next tournament tier accommodates 12 tournament entries (i.e., has 12 "slots" or "positions"), the twice-selected tournament entry may be associated with two of those positions. In such a scenario, the tournament entry associated with the multiple positions of the next-tier tournament entry set may be treated in a variety of ways. In some implementations, the tournament entry may be replicated as many times as is necessary in order to fill the number of slots or positions of the next-tier tournament entry set to which it is to be associated with. In some such implementations, the score associated with that tournament entry may be replicated for each such replicated tournament entry, turning each such replicated tournament entry into an independent copy of the preliminarily selected tournament entry.

In other such implementations, the score of the multiply preliminarily selected tournament entry may be evenly split between the replicated tournament entries (for example, if a tournament entry was preliminarily selected twice, the score associated therewith may be split 50/50 between that tournament entry and a copy thereof that are assigned to a tournament entry set or sets of the next tournament tier).

In yet other implementations, only a multiply preliminarily selected tournament entry may be advanced to the next tier tournament entry set as a single tournament entry (without replication), but it may be treated by the MAT system such that it has a proportionately higher chance of being selected for advancement to the next tier of the tournament or preliminarily selected for score modification in association with that next-tier tournament entry set. In such a scenario, the advancement of that tournament entry may also be treated as "filling" a corresponding number of slots or positions of the tournament entry set of the next tier of the tournament. For example, if a tournament entry is preliminarily selected twice, it may be treated as if it occupies two spots of a next-tier tournament entry set—the number of available tournament entry slots in that next-tier tournament entry set may be reduced by two instead of one, and the chance of that advanced tournament entry being preliminarily selected for score modification or selected for advancement in association with that next-tier tournament entry set may be twice what it would normally be. In such implementations, the unity between the tournament entry and the score associated therewith may be maintained such that the score is not replicated.

It will be further appreciated that score modification effects may not be cumulatively applied during the rounds of score modification for a given tournament entry set. For example, an MAT may be configured to cause multiple rounds of score modification to be performed for a given tournament entry set and may permit a given tournament entry to be preliminarily selected in multiple such score modification rounds. However, the multiplicative effect of such multipliers may be held in abeyance, so to speak, until after the last such round of score modification for the tournament entry set is performed. In such implementations, a tournament entry that is preliminarily selected in more than one round of score modification for that tournament entry set may be associated with each multiplier (or other score modification mechanism, such as a fixed amount that is to be added to the score) associated with a given round of score modification after being preliminarily selected for that round of score modification. If a better multiplier (or other score modification mechanism) is later associated with that tournament entry, it may simply replace the previously associated one. Thus, for example, if a tournament entry is preliminarily selected in a first round of score modification associated with a 2× multiplier and is then selected again in the next round of score modification, which is associated with a 3× multiplier, the score associated with the tournament entry would be subjected to a 3× multiplier (instead of a 6× multiplier). In such implementations, the score of a tournament entry immediately prior to the application of any multipliers earned in the various rounds of score modification for a given tournament entry set may be retained and the values of the multipliers that may be applied to that score may be stored (and, optionally, displayed) separately.

It will also be appreciated that the "face value" associated with a tournament entry, i.e., the score that is associated with that tournament entry when that tournament entry is initially associated with a given tournament entry set (which may also be referred to herein, as previously discussed, as a "base score"), may, in some implementations, be kept static or reset with some or all advancements of that tournament entry to another tier of the MAT. For example, a tournament entry may have a score of 50 credits associated therewith when it is first associated with a tournament entry set, i.e., a face value of 50 credits. The tournament entry may then be preliminarily selected during a round of score modification and be subjected to a 3× multiplier as a consequence of such preliminary selection. In some implementations, the player associated with that tournament entry may receive a payout of 150 credits (three times the face value of 50 credits) after all of the rounds of score modification for that tournament entry set have completed, but the face value of the tournament entry may remain at (or be reset to) 50 credits when that tournament entry is advanced to the next tier tournament entry set. In such a scenario, the player's score does not change from tournament entry set to tournament entry set, even if the score effectively changes within one or more of those tournament entry sets. In some alternative such implementations, the face value associated with a tournament entry may be modified in some circumstances. For example, there may be some rounds of score modification where the modification of the scores of the preliminarily selected tournament entries is caused to be carried forward to higher-tier tournament entry sets as the face values for those tournament entries, effectively making the score modification permanent. In some other or additional such implementations, some tournament entry sets, e.g., all of the tournament entry sets for a given tier or a random or predetermined proper subset of such tournament entry sets may have the score modifications that are applied to the scores of the tournament entries that are in those tournament entry sets be carried forward to tournament entry sets in the next highest tier of the MAT. In yet other implementations, "permanent" increases in face value may be effected by other mechanisms, e.g., random award of a face value increase that may be completely independent of any score modification round outcome.

If it is determined in block 612 that all rounds of score modification for the given tournament entry set have not been performed, the technique may return to block 606, and a further round of score modification may occur.

When such score modification rounds are implemented and then represented graphically such that players associated with tournament entries for the given tournament entry set can observe a graphical representation of the rounds of score modification, this may give the appearance that the given tournament entry set is involved in a "mini-game," the outcome of which may not be immediately apparent—this may generate increased tension and interest on the part of these players. For example, if each tournament entry set is represented by a wheel display, as discussed earlier, each preliminary selection of a tournament entry may be represented by causing a pointer to rotate about the exterior of the wheel until the preliminarily selected wheel sector representing the preliminarily selected tournament entry is indicated by the pointer. Such an animation may take several seconds to complete, and may be accompanied by various additional graphics and animations that spark player interest.

If it is determined in block 612 that all rounds of score modification for the given tournament entry set have been performed, the technique may proceed to block 614, where the computing system may select one or more tournament entries for advancement to the next tournament tier, e.g., to have the one or more players associated therewith be associated with one or more tournament entries associated with a tournament entry set of the next-highest tournament tier. Such selection may generally be randomly based, although such randomness may be introduced in a variety of ways. For example, in some implementations, such as that shown in block 614*a*, the tournament entry selected in block 614 may simply be the tournament entry that was preliminarily selected in the most recent round of score modification for the given tournament entry set. In this scenario, the preliminary selection of the tournament entry for the last round of score modification and the selection of the tournament entry in block 614 may simply be the same selection event in some implementations, i.e., there may not be separate selection events between 612 (for the last round of score modification) and 614 for a given tournament entry set. In some implementations of the selection technique of block 614*a*, players may experience heightened tension if watching a graphical representation of the score modification rounds, as players may have their tournament entries preliminarily selected in earlier rounds and see their scores increase, but may not know if those score modifications will be able to be carried forward to the next tournament tier until the last round of score modification for the given tournament entry set occurs. In some implementations where multiple (X) tournament entries from the given tournament entry set are selected for advancement to the next tournament tier, the tournament entries from the last (X) preliminary selections for the given tournament entry set may be selected for advancement to the next tournament tier.

In other implementations, such as that shown in FIG. 614*b*, a tournament entry may be selected based on the outcomes of the score modification that may have occurred as a result of the score modification rounds of blocks 606 through 610. For example, the tournament entry associated with the total highest score (or scores, if multiple tournament entries are to be selected) or, in some implementations, the largest net change (or net changes if multiple tournament entries are to be selected) as a result of the score modification rounds for the given tournament entry set may, after the score modification rounds for the given tournament entry set have been completed, be selected as the tournament entry or entries for advancement to the next-highest tournament tier. It will also be appreciated that, in some implementations, preliminary selection of one or more tournament entries from a tournament entry set and selection of one or more tournament entries from that tournament entry set for advancement to a tournament entry set of the next tier of the tournament may be entirely decoupled. In such implementations, preliminary selection for score modification may occur, and then a separate determination of which tournament entries are to advance to the next tournament tier may occur. Thus, the tournament entry or entries that are selected to advance to the next tournament tier may or may not be tournament entries that were preliminarily selected and subjected to score modification.

In block 616, the player or players associated with the tournament entry or entries selected in block 614 may be associated with a tournament entry or entries in a tournament entry set associated with the next-highest tournament tier (or, if the given tournament entry set is associated with the final tournament tier, selected as a winner or winners of the MAT).

In block 618, the score associated with each tournament entry selected in block 614 may be associated with the tournament entry of the tournament entry set of the next-highest tournament tier that is associated with the same player as the corresponding tournament entry selected in block 614. Such score association may involve, for example, associating the score as modified by the score modification rounds for the given tournament entry set with the tournament entry from the tournament entry set of the next-highest tournament tier, as set forth in block 618*a*, or may, in other implementations and as set forth in block 618*b*, involve associating the score at the value it was prior to the score modification from the one or more score modification rounds with the tournament entry from the tournament entry set of the next-highest tournament tier.

The MAT techniques and systems discussed herein are flexibly configurable, e.g., by varying the number of tournament tiers, tournament entry sets, and tournament entries per tournament entry set, and may thus be easily tailored to provide MATs for groups of players numbering in the tens of players all the way up to MATs for groups of players in the thousands, tens of thousands, hundreds of thousands, or even millions.

MATs may be configured in any number of ways, and may, in particular, be configured to provide tournament entries to players based on any number of conditions. For example, in the scenarios discussed above, a player may "earn" a tournament entry by achieving a particular outcome in a base game or due to a game play event in such a base game or a bonus game. Other such triggering events for awarding an tournament entry into an MAT may include, for example, when a player wagers a particular threshold amount (or more) in play of a base game, plays a base game at a particular time or during a particular time window, plays a base game for a particular duration of time (or longer) or a particular cumulative wagered amount (coin-in), plays in a particular area of a casino (or in a particular casino property), plays a particular type of base game, sends an invitation to a friend to play a base game (and/or has the friend accept the invitation), stays at a casino property or affiliated property for a threshold period of time, spends a threshold amount of money at a casino property, gains entry into a traditional slot machine tournament, and so on.

It will be understood that other architectures for providing similar functionality to that described above are considered within the scope of this disclosure as well. For example, in some implementations, if a tournament entry from a tournament entry set is selected after the tournament entry set has the threshold number of tournament entries associated therewith, the computing system managing the MAT may simply assign that tournament entry (and its associated player) to a tournament entry set of a higher-level tournament tier rather than assigning the player associated therewith to a new tournament entry in that higher-level tournament tier tournament entry set. For the purposes of this disclosure, such an implementation, as well as other implementations that may achieve the same apparent functionality, are considered to be equivalent to associating the player with a tournament entry of a tournament entry set of the higher-level tournament tier.

In addition to the various implementations described above, at least the following specific implementations are considered to be within the scope of this disclosure.

Implementation 1: A tournament server including: one or more processors; and one or more memory devices, wherein: the one or more processors and the one or more memory devices are operably connected, and the one or more memory devices store computer-executable instructions which, when executed by the one or more processors, cause the one or more processors to at least: a) generate a plurality of tournament entry sets, wherein each tournament entry set is associated with a corresponding tournament tier of N tournament tiers for a multilevel autonomous tournament, N is an integer greater than 1, each tournament entry set is associated with a corresponding threshold number of tournament entries for that tournament entry set, and the Nth tournament tier has a single tournament entry set associated therewith; b) receive a plurality of player entry indications for the multilevel autonomous tournament, each player entry indication including information that associates the player entry indication with a particular player identifier; c) associate, for each received player entry indication, the player identifier associated with that player entry identification with one of the tournament entries of one of the tournament entry sets for the first tournament tier; d) select, for each tournament entry set associated with a tournament tier of the multilevel autonomous tournament other than the Nth tournament tier, after the corresponding threshold number of tournament entries for that tournament entry set have each been associated with a corresponding player identifier, and based at least in part on a random outcome, one or more of the tournament entries for that tournament entry set; e) associate, for each tournament entry selected in (d), the player identifier associated with that selected tournament entry with a corresponding one of the tournament entries for the tournament entry set or one of the tournament entry sets of the tournament tier one tier higher than the tournament tier of that selected tournament entry; and f) select, after the corresponding threshold number of tournament entries for the tournament entry set associated with the Nth tournament tier have each been associated with a corresponding player identifier, one of the tournament entries of that tournament entry set as a winner of the multilevel autonomous tournament.

Implementation 2: The tournament server of implementation 1, wherein the one or more memory devices further store additional computer-executable instructions which, when executed by the one or more processors, further cause the one or more processors to at least cause, for each tournament entry set, a graphical representation of that tournament entry set to be displayed on one or more displays, wherein the graphical representation of each tournament entry set is a wheel divided in to a plurality of segments and each segment of that wheel represents one of the tournament entries for that tournament entry set.

Implementation 3: The tournament server of implementation 2, wherein each wheel has between 6 and 20 segments.

Implementation 4: The tournament server of implementation 2, wherein the wheels all have the same number of segments.

Implementation 5: The tournament server of implementation 1, wherein the one or more memory devices further store additional computer-executable instructions which, when executed by the one or more processors, further cause the one or more processors to at least perform (d) for the tournament entry sets for each tournament tier after player identifiers have been associated with the threshold number of tournament entries for all of the tournament entry sets associated with that tournament tier.

Implementation 6: The tournament server of implementation 1, wherein the one or more memory devices further store additional computer-executable instructions which, when executed by the one or more processors, further cause the one or more processors to at least perform (d) for each tournament entry set as the threshold number of tournament entries for that tournament entry set are associated with player identifiers.

Implementation 7: The tournament server of implementation 1, wherein the one or more memory devices further store additional computer-executable instructions which, when executed by the one or more processors, further cause the one or more processors to at least generate the tournament entry sets such that the second through Nth tournament tiers are each associated with a lower number of tournament entry sets than the next lowest tournament tier.

Implementation 8: The tournament server of implementation 1, wherein the one or more memory devices further store additional computer-executable instructions which, when executed by the one or more processors, further cause the one or more processors to at least perform (d) for each of the tournament entry sets associated with the tournament tier or tournament tiers of the multilevel autonomous tournament other than the Nth tournament tier automatically once the player identifiers associated with the tournament entries for that tournament entry set have been associated with the tournament entries for that tournament entry set.

Implementation 9: The tournament server of implementation 1, wherein each player entry indication is indicative of a player associated with the player identifier associated therewith achieving an outcome in a base wagering game that awards an entry into the multilevel autonomous tournament.

Implementation 10: The tournament server of implementation 1, wherein: the tournament entry sets for the first tournament tier include a first set of tournament entry sets; each tournament entry set in the first set of tournament entry sets is associated with a different corresponding set of electronic gaming machines; and the one or more memory devices further store additional computer-executable instructions which, when executed by the one or more processors, further cause the one or more processors to, for each tournament entry set in the first set of tournament entry sets, at least only associate player identifiers with the tournament entries for that tournament entry set responsive to player entry indications originating from electronic gaming machines in the set of electronic gaming machines corresponding with that tournament entry set.

Implementation 11: The tournament server of implementation 10, wherein each set of electronic gaming machines is selected from the sets consisting of: a set of electronic gaming machines that are in a common bank of electronic gaming machines, a set of electronic gaming machines that are in a particular area of a casino, a set of electronic gaming machines that are in a particular casino, and a set of electronic gaming machines that are distributed across a plurality of casinos.

Implementation 12: The tournament server of implementation 1, wherein the one or more memory devices further store additional computer-executable instructions which, when executed by the one or more processors, further cause the one or more processors to at least: i) determine, for each tournament entry associated with the tournament entry sets associated with the first tournament tier, a score associated therewith; ii) perform, for each tournament entry set and after the corresponding threshold number of tournament entries for that tournament entry set have each been associated with a corresponding player identifier, one or more rounds of score modification for that tournament entry set, wherein each round of score modification for a tournament entry set includes: 1) randomly selecting one or more of the tournament entries for that tournament entry set, and 2) modifying each score associated with the one or more tournament entries selected in (1) by performing an action selected from the group consisting of: multiplying the score by a multiplier value and adding an additional amount to the score; and iii) cause the score, as modified in (2), associated with each tournament entry selected in (d) to also be associated with the tournament entry that is associated in (e) with the player identifier for the tournament entry selected in (d).

Implementation 13: The tournament server of implementation 12, wherein the one or more memory devices further store additional computer-executable instructions which, when executed by the one or more processors, further cause the one or more processors to at least cause a player associated with the player identifier associated with the tournament entry that is selected as the winner of the multilevel autonomous tournament in (f) to be awarded a monetary amount proportional to the score associated with that tournament entry.

Implementation 14: The tournament server of implementation 12, wherein the one or more memory devices further store additional computer-executable instructions which, when executed by the one or more processors, further cause the one or more processors to at least select the one or more tournament entries in (d) based on the scores, as modified in (2), of the tournament entries within each tournament entry set associated with the tournament tier or tournament tiers of the multilevel autonomous tournament other than the Nth tournament tier.

Implementation 15: The tournament server of implementation 12, wherein the one or more memory devices further store additional computer-executable instructions which, when executed by the one or more processors, further cause the one or more processors to at least use the one or more tournament entries selected in the final round of score modification for each tournament entry set associated with the tournament tier or tournament tiers of the multilevel autonomous tournament other than the Nth tournament tier as the one or more tournament entries selected in (d) for that tournament entry set.

Implementation 16: The tournament server of implementation 1, wherein the one or more memory devices further store additional computer-executable instructions which, when executed by the one or more processors, further cause the one or more processors to at least, for each tournament entry selected in (d) and (f), randomly select that tournament entry.

Implementation 17: A method including: a) generating a plurality of tournament entry sets using a tournament server, wherein each tournament entry set is associated with a corresponding tournament tier of N tournament tiers for a multilevel autonomous tournament, N is an integer greater than 1, each tournament entry set is associated with a corresponding threshold number of tournament entries for that tournament entry set, and the Nth tournament tier has a single tournament entry set associated therewith; b) receiving, by the tournament server, a plurality of player entry indications for the multilevel autonomous tournament, each player entry indication including information that associates the player entry indication with a particular player identifier; c) associating, for each received player entry indication and by the tournament server, the player identifier associated with that player entry identification with one of the tournament entries of one of the tournament entry sets for the first tournament tier; d) selecting, by the tournament server and for each tournament entry set associated with a tournament tier of the multilevel autonomous tournament other than the Nth tournament tier, after the corresponding threshold number of tournament entries for that tournament entry set have each been associated with a corresponding player identifier, and based at least in part on a random outcome, one or more of the tournament entries for that tournament entry set; e) associating, by the tournament server and for each tournament entry selected in (d), the player identifier associated with that selected tournament entry with a corresponding one of the tournament entries for the tournament entry set or one of the tournament entry sets of the tournament tier one tier higher than the tournament tier of that selected tournament entry; and f) selecting, by the tournament server and after the corresponding threshold number of tournament entries for the tournament entry set associated with the Nth tournament tier have each been associated with a corresponding player identifier, one of the tournament entries of that tournament entry set as a winner of the multilevel autonomous tournament.

Implementation 18: The method of implementation 17, further including causing, by the tournament server and for each tournament entry set, a graphical representation of that tournament entry set to be displayed on one or more displays, wherein the graphical representation of each tournament entry set is a wheel divided in to a plurality of segments and each segment of that wheel represents one of the tournament entries for that tournament entry set.

Implementation 19: The method of implementation 18, wherein each wheel has between 6 and 20 segments.

Implementation 20: The method of implementation 18, wherein the wheels all have the same number of segments.

Implementation 21: The method of implementation 17, further including performing, by the tournament server, (d) for the tournament entry sets for each tournament tier after player identifiers have been associated with the threshold number of tournament entries for all of the tournament entry sets associated with that tournament tier.

Implementation 22: The method of implementation 17, further including performing (d), by the tournament server, for each tournament entry set as the threshold number of tournament entries for that tournament entry set are associated with player identifiers.

Implementation 23: The method of implementation 17, further including generating, by the tournament server, the tournament entry sets such that the second through Nth tournament tiers are each associated with a lower number of tournament entry sets than the next lowest tournament tier.

Implementation 24: The method of implementation 17, further including performing, by the tournament server, (d) for each of the tournament entry sets associated with the tournament tier or tournament tiers of the multilevel autonomous tournament other than the Nth tournament tier automatically once the player identifiers associated with the tournament entries for that tournament entry set have been associated with the tournament entries for that tournament entry set.

Implementation 25: The method of implementation 17, wherein each player entry indication is indicative of a player associated with the player identifier associated therewith achieving an outcome in a base wagering game that awards an entry into the multilevel autonomous tournament.

Implementation 26: The method of implementation 17, wherein: the tournament entry sets for the first tournament tier include a first set of tournament entry sets; each tournament entry set in the first set of tournament entry sets is associated with a different corresponding set of electronic gaming machines; and the method further includes, for each tournament entry set in the first set of tournament entry sets, only associating, by the tournament server, player identifiers with the tournament entries for that tournament entry set responsive to player entry indications originating from electronic gaming machines in the set of electronic gaming machines corresponding with that tournament entry set.

Implementation 27: The method of implementation 26, wherein each set of electronic gaming machines is selected from the sets consisting of: a set of electronic gaming machines that are in a common bank of electronic gaming machines, a set of electronic gaming machines that are in a particular area of a casino, a set of electronic gaming machines that are in a particular casino, and a set of electronic gaming machines that are distributed across a plurality of casinos.

Implementation 28: The method of implementation 17, further including: i) determining, by the tournament server and for each tournament entry associated with the tournament entry sets associated with the first tournament tier, a score associated therewith; ii) performing, by the tournament server, for each tournament entry set, and after the corresponding threshold number of tournament entries for that tournament entry set have each been associated with a corresponding player identifier, one or more rounds of score modification for that tournament entry set, wherein each round of score modification for a tournament entry set includes: 1) randomly selecting, by the tournament server, one or more of the tournament entries for that tournament entry set, and 2) modifying, by the tournament server, each score associated with the one or more tournament entries selected in (1) by performing an action selected from the group consisting of: multiplying the score by a multiplier value and adding an additional amount to the score; and iii) causing, by the tournament server, the score, as modified in (2), associated with each tournament entry selected in (d) to also be associated with the tournament entry that is associated in (e) with the player identifier for the tournament entry selected in (d).

Implementation 29: The method of implementation 28, further including causing, by the tournament server, a player associated with the player identifier associated with the tournament entry that is selected as the winner of the multilevel autonomous tournament in (f) to be awarded a monetary amount proportional to the score associated with that tournament entry.

Implementation 30: The method of implementation 28, further including selecting, by the tournament server, the one or more tournament entries in (d) based on the scores, as modified in (2), of the tournament entries within each tournament entry set associated with the tournament tier or tournament tiers of the multilevel autonomous tournament other than the Nth tournament tier.

Implementation 31: The method of implementation 28, further including using, by the tournament server, the one or more tournament entries selected in the final round of score modification for each tournament entry set associated with the tournament tier or tournament tiers of the multilevel autonomous tournament other than the Nth tournament tier as the one or more tournament entries selected in (d) for that tournament entry set.

Implementation 32: The method of implementation 17, further including randomly selecting, by the tournament server and for each tournament entry selected in (d) and (f), that tournament entry.

Implementation 33: A non-transitory computer-readable medium storing computer-executable instructions which, when executed by one or more processors of a tournament server, cause the one or more processors to at least: a) generate a plurality of tournament entry sets, wherein each tournament entry set is associated with a corresponding tournament tier of N tournament tiers for a multilevel autonomous tournament, N is an integer greater than 1, each tournament entry set is associated with a corresponding threshold number of tournament entries for that tournament entry set, and the Nth tournament tier has a single tournament entry set associated therewith; b) receive a plurality of player entry indications for the multilevel autonomous tournament, each player entry indication including information that associates the player entry indication with a particular player identifier; c) associate, for each received player entry indication, the player identifier associated with that player entry identification with one of the tournament entries of one of the tournament entry sets for the first tournament tier; d) select, for each tournament entry set associated with a tournament tier of the multilevel autonomous tournament other than the Nth tournament tier, after the corresponding threshold number of tournament entries for that tournament entry set have each been associated with a corresponding player identifier, and based at least in part on a random outcome, one or more of the tournament entries for that tournament entry set; e) associate, for each tournament entry selected in (d), the player identifier associated with that selected tournament entry with a corresponding one of the tournament entries for the tournament entry set or one of the tournament entry sets of the tournament tier one tier higher than the tournament tier of that selected tournament entry; and f) select, after the corresponding threshold number of tournament entries for the tournament entry set associated with the Nth tournament tier have each been associated with a corresponding player identifier, one of the tournament entries of that tournament entry set as a winner of the multilevel autonomous tournament.

Implementation 34: The non-transitory computer-readable medium of implementation 33, wherein the non-transitory computer-readable medium stores further computer-executable instructions which, when executed by the one or more processors of the tournament server, cause the one or more processors of the tournament server to at least cause, for each tournament entry set, a graphical representation of that tournament entry set to be displayed on one or more displays, wherein the graphical representation of each tournament entry set is a wheel divided in to a plurality of segments and each segment of that wheel represents one of the tournament entries for that tournament entry set.

Implementation 35: The non-transitory computer-readable medium of implementation 34, wherein each wheel has between 6 and 20 segments.

Implementation 36: The non-transitory computer-readable medium of implementation 34, wherein the wheels all have the same number of segments.

Implementation 37: The non-transitory computer-readable medium of implementation 33, wherein the non-transitory computer-readable medium stores further computer-executable instructions which, when executed by the one or more processors of the tournament server, cause the one or more processors of the tournament server to at least perform (d) for the tournament entry sets for each tournament tier after player identifiers have been associated with the threshold number of tournament entries for all of the tournament entry sets associated with that tournament tier.

Implementation 38: The non-transitory computer-readable medium of implementation 33, wherein the non-transitory computer-readable medium stores further computer-executable instructions which, when executed by the one or more processors of the tournament server, cause the one or more processors of the tournament server to at least perform (d) for each tournament entry set as the threshold number of tournament entries for that tournament entry set are associated with player identifiers.

Implementation 39: The non-transitory computer-readable medium of implementation 33, wherein the non-transitory computer-readable medium stores further computer-executable instructions which, when executed by the one or more processors of the tournament server, cause the one or more processors of the tournament server to at least generate the tournament entry sets such that the second through Nth tournament tiers are each associated with a lower number of tournament entry sets than the next lowest tournament tier.

Implementation 40: The non-transitory computer-readable medium of implementation 33, wherein the non-transitory computer-readable medium stores further computer-executable instructions which, when executed by the one or more processors of the tournament server, cause the one or more processors of the tournament server to at least perform (d) for each of the tournament entry sets associated with the tournament tier or tournament tiers of the multilevel autonomous tournament other than the Nth tournament tier automatically once the player identifiers associated with the tournament entries for that tournament entry set have been associated with the tournament entries for that tournament entry set.

Implementation 41: The non-transitory computer-readable medium of implementation 33, wherein each player entry indication is indicative of a player associated with the player identifier associated therewith achieving an outcome in a base wagering game that awards an entry into the multilevel autonomous tournament.

Implementation 42: The non-transitory computer-readable medium of implementation 33, wherein: the tournament entry sets for the first tournament tier include a first set of tournament entry sets; each tournament entry set in the first set of tournament entry sets is associated with a different corresponding set of electronic gaming machines; and the non-transitory computer-readable medium stores further computer-executable instructions which, when executed by the one or more processors of the tournament server, cause the one or more processors of the tournament server to, for each tournament entry set in the first set of tournament entry sets, at least only associate player identifiers with the tournament entries for that tournament entry set responsive to player entry indications originating from electronic gaming machines in the set of electronic gaming machines corresponding with that tournament entry set.

Implementation 43: The non-transitory computer-readable medium of implementation 42, wherein each set of electronic gaming machines is selected from the sets consisting of: a set of electronic gaming machines that are in a common bank of electronic gaming machines, a set of electronic gaming machines that are in a particular area of a casino, a set of electronic gaming machines that are in a particular casino, and a set of electronic gaming machines that are distributed across a plurality of casinos.

Implementation 44: The non-transitory computer-readable medium of implementation 33, wherein the non-transitory computer-readable medium stores further computer-executable instructions which, when executed by the one or more processors of the tournament server, cause the one or more processors of the tournament server to at least: i) determine, for each tournament entry associated with the tournament entry sets associated with the first tournament tier, a score associated therewith; ii) perform, for each tournament entry set and after the corresponding threshold number of tournament entries for that tournament entry set have each been associated with a corresponding player identifier, one or more rounds of score modification for that tournament entry set, wherein each round of score modification for a tournament entry set includes: 1) randomly selecting one or more of the tournament entries for that tournament entry set, and 2) modifying each score associated with the one or more tournament entries selected in (1) by performing an action selected from the group consisting of: multiplying the score by a multiplier value and adding an additional amount to the score; and iii) cause the score, as modified in (2), associated with each tournament entry selected in (d) to also be associated with the tournament entry that is associated in (e) with the player identifier for the tournament entry selected in (d).

Implementation 45: The non-transitory computer-readable medium of implementation 44, wherein the non-transitory computer-readable medium stores further computer-executable instructions which, when executed by the one or more processors of the tournament server, cause the one or more processors of the tournament server to at least cause a player associated with the player identifier associated with the tournament entry that is selected as the winner of the multilevel autonomous tournament in (f) to be awarded a monetary amount proportional to the score associated with that tournament entry.

Implementation 46: The non-transitory computer-readable medium of implementation 44, wherein the non-transitory computer-readable medium stores further computer-executable instructions which, when executed by the one or more processors of the tournament server, cause the one or more processors of the tournament server to at least select the one or more tournament entries in (d) based on the scores, as modified in (2), of the tournament entries within each tournament entry set associated with the tournament tier or tournament tiers of the multilevel autonomous tournament other than the Nth tournament tier.

Implementation 47: The non-transitory computer-readable medium of implementation 44, wherein the non-transitory computer-readable medium stores further computer-executable instructions which, when executed by the one or more processors of the tournament server, cause the one or more processors of the tournament server to at least use the one or more tournament entries selected in the final round of score modification for each tournament entry set associated with the tournament tier or tournament tiers of the multilevel autonomous tournament other than the Nth tournament tier as the one or more tournament entries selected in (d) for that tournament entry set.

Implementation 48: The non-transitory computer-readable medium of implementation 33, wherein the non-transitory computer-readable medium stores further computer-executable instructions which, when executed by the one or more processors of the tournament server, cause the one or more processors of the tournament server to at least, for each tournament entry selected in (d) and (f), randomly select that tournament entry.

The above-listed implementations are not to be considered an exclusive list of possible implementations, and other, unlisted implementations based on the description and Figures herein are also to be understood to be within the scope of this disclosure.

It is to be understood that the phrases "for each <item> of the one or more <items>," "each <item> of the one or more <items>," or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i)

involves the handling of an element that is created in step (ii), the reverse is to be understood.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A non-transitory computer-readable medium storing computer-executable instructions which, when executed by one or more processors of a tournament server, cause the one or more processors to at least:

a) generate a plurality of tournament entry sets, wherein each tournament entry set is associated with a corresponding tournament tier of N tournament tiers for a multilevel autonomous tournament, N is an integer greater than 1, each tournament entry set is associated with a corresponding threshold number of tournament entries for that tournament entry set, and the Nth tournament tier has a single tournament entry set associated therewith;

b) receive a plurality of player entry indications for the multilevel autonomous tournament, each player entry indication including information that associates the player entry indication with a particular player identifier;

c) associate, for each received player entry indication, the player identifier associated with that player entry identification with one of the tournament entries of one of the tournament entry sets for the first tournament tier;

d) select, for each tournament entry set associated with a tournament tier of the multilevel autonomous tournament other than the Nth tournament tier, after the corresponding threshold number of tournament entries for that tournament entry set have each been associated with a corresponding player identifier, and based at least in part on a random outcome, one or more of the tournament entries for that tournament entry set;

e) associate, for each tournament entry selected in (d), the player identifier associated with that selected tournament entry with a corresponding one of the tournament entries for the tournament entry set or one of the tournament entry sets of the tournament tier one tier higher than the tournament tier of that selected tournament entry; and f) select, after the corresponding threshold number of tournament entries for the tournament entry set associated with the Nth tournament tier have each been associated with a corresponding player identifier, one of the tournament entries of that tournament entry set as a winner of the multilevel autonomous tournament.

2. The non-transitory computer-readable medium of claim 1, wherein the non-transitory computer-readable medium stores further computer-executable instructions which, when executed by the one or more processors of the tournament server, cause the one or more processors of the tournament server to at least cause, for each tournament entry set, a graphical representation of that tournament entry set to be displayed on one or more displays, wherein the graphical representation of each tournament entry set is a wheel divided in to a plurality of segments and each segment of that wheel represents one of the tournament entries for that tournament entry set.

3. The non-transitory computer-readable medium of claim 2, wherein each wheel has between 6 and 20 segments.

4. The non-transitory computer-readable medium of claim 2, wherein the wheels all have the same number of segments.

5. The non-transitory computer-readable medium of claim 1, wherein the non-transitory computer-readable medium stores further computer-executable instructions which, when executed by the one or more processors of the tournament server, cause the one or more processors of the tournament server to at least perform (d) for the tournament entry sets for each tournament tier after player identifiers have been associated with the threshold number of tournament entries for all of the tournament entry sets associated with that tournament tier.

6. The non-transitory computer-readable medium of claim 1, wherein the non-transitory computer-readable medium stores further computer-executable instructions which, when executed by the one or more processors of the tournament server, cause the one or more processors of the tournament server to at least perform (d) for each tournament entry set as the threshold number of tournament entries for that tournament entry set are associated with player identifiers.

7. The non-transitory computer-readable medium of claim 1, wherein the non-transitory computer-readable medium stores further computer-executable instructions which, when executed by the one or more processors of the tournament server, cause the one or more processors of the tournament server to at least generate the tournament entry sets such that the second through Nth tournament tiers are each associated with a lower number of tournament entry sets than the next lowest tournament tier.

8. The non-transitory computer-readable medium of claim 1, wherein the non-transitory computer-readable medium stores further computer-executable instructions which, when executed by the one or more processors of the tournament server, cause the one or more processors of the tournament server to at least perform (d) for each of the tournament entry sets associated with the tournament tier or tournament tiers of the multilevel autonomous tournament other than the Nth tournament tier automatically once the player identifiers associated with the tournament entries for that tournament entry set have been associated with the tournament entries for that tournament entry set.

9. The non-transitory computer-readable medium of claim 1, wherein the non-transitory computer-readable medium stores further computer-executable instructions which, when executed by the one or more processors of the tournament server, cause the one or more processors of the tournament server to perform (d) for each of the tournament entry sets associated with the tournament tier or tournament tiers of the multilevel autonomous tournament automatically once the player identifiers associated with the tournament entries for that tournament entry set have been associated with the tournament entries for that tournament entry set.

10. The non-transitory computer-readable medium of claim 1, wherein each player entry indication is indicative of a player associated with the player identifier associated therewith achieving an outcome in a base wagering game that awards an entry into the multilevel autonomous tournament.

11. The non-transitory computer-readable medium of claim 1, wherein:

the tournament entry sets for the first tournament tier include a first set of tournament entry sets;

each tournament entry set in the first set of tournament entry sets is associated with a different corresponding set of electronic gaming machines; and the non-transitory computer-readable medium stores further computer-executable instructions which, when executed by the one or more processors of the tournament server, cause the one or more processors of the tournament server to, for each tournament entry set in the first set of tournament entry sets, at least only associate player identifiers with the tournament entries for that tournament entry set responsive to player entry indications originating from electronic gaming machines in the set of electronic gaming machines corresponding with that tournament entry set.

12. The non-transitory computer-readable medium of claim 11, wherein each set of electronic gaming machines is selected from the sets consisting of: a set of electronic gaming machines that are in a common bank of electronic gaming machines, a set of electronic gaming machines that are in a particular area of a casino, a set of electronic gaming machines that are in a particular casino, and a set of electronic gaming machines that are distributed across a plurality of casinos.

13. The non-transitory computer-readable medium of claim 1, wherein the non-transitory computer-readable medium stores further computer-executable instructions which, when executed by the one or more processors of the tournament server, cause the one or more processors of the tournament server to at least:

i) determine, for each tournament entry associated with the tournament entry sets associated with the first tournament tier, a score associated therewith;

ii) perform, for each tournament entry set and after the corresponding threshold number of tournament entries for that tournament entry set have each been associated with a corresponding player identifier, one or more rounds of score modification for that tournament entry set, wherein each round of score modification for a tournament entry set includes:

1) Randomly selecting one or more of the tournament entries for that tournament entry set, and 2) Modifying each score associated with the one or more tournament entries selected in (1) by performing an action selected from the group consisting of: multiplying the score by a multiplier value and adding an additional amount to the score; and iii) cause the score, as modified in (2), associated with each tournament entry selected in (d) to also be associated with the tournament entry that is associated in (e) with the player identifier for the tournament entry selected in (d).

14. The non-transitory computer-readable medium of claim 13, wherein the non-transitory computer-readable medium stores further computer-executable instructions which, when executed by the one or more processors of the tournament server, cause the one or more processors of the tournament server to at least cause a player associated with the player identifier associated with the tournament entry that is selected as the winner of the multilevel autonomous tournament in (f) to be awarded a monetary amount proportional to the score associated with that tournament entry.

15. The non-transitory computer-readable medium of claim 13, wherein the non-transitory computer-readable medium stores further computer-executable instructions which, when executed by the one or more processors of the tournament server, cause the one or more processors of the tournament server to at least select the one or more tournament entries in (d) based on the scores, as modified in (2), of the tournament entries within each tournament entry set associated with the tournament tier or tournament tiers of the multilevel autonomous tournament other than the Nth tournament tier.

16. The non-transitory computer-readable medium of claim 13, wherein the non-transitory computer-readable medium stores further computer-executable instructions which, when executed by the one or more processors of the tournament server, cause the one or more processors of the tournament server to at least use the one or more tournament entries selected in the final round of score modification for each tournament entry set associated with the tournament tier or tournament tiers of the multilevel autonomous tournament other than the Nth tournament tier as the one or more tournament entries selected in (d) for that tournament entry set.

17. The non-transitory computer-readable medium of claim 1, wherein the non-transitory computer-readable medium stores further computer-executable instructions which, when executed by the one or more processors of the tournament server, cause the one or more processors of the tournament server to at least, for each tournament entry selected in (d) and (f), randomly select that tournament entry.

18. The non-transitory computer-readable medium of claim 1, wherein the non-transitory computer-readable medium stores further computer-executable instructions which, when executed by the one or more processors of the tournament server, cause the one or more processors of the tournament server to:

determine that a first player of a wagering game has satisfied one or more tournament entry conditions for the multilevel autonomous tournament;

generate a first player entry indication responsive to determining that the player of the wagering game has satisfied the one or more tournament entry conditions;

associate a first player identifier associated with the first player entry indication with one or more of the tournament entries.

19. The non-transitory, computer-readable medium of claim 18, wherein the one or more tournament entry conditions are satisfied based, at least in part, on an outcome of the wagering game obtained by the first player.

20. The non-transitory, computer-readable medium of claim 18, wherein the one or more tournament entry conditions are satisfied based on, at least in part, a cumulative amount wagered by the first player in the wagering game.

* * * * *